(12) United States Patent
Bobak et al.

(10) Patent No.: US 8,346,931 B2
(45) Date of Patent: Jan. 1, 2013

(54) CONDITIONAL COMPUTER RUNTIME CONTROL OF AN INFORMATION TECHNOLOGY ENVIRONMENT BASED ON PAIRING CONSTRUCTS

(75) Inventors: Mythili K. Bobak, Lagrangeville, NY (US); Chun-Shi Chang, Poughkeepsie, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/965,874

(22) Filed: Dec. 28, 2007

(65) Prior Publication Data

US 2009/0172668 A1 Jul. 2, 2009

(51) Int. Cl.
*G06F 15/173* (2006.01)
(52) U.S. Cl. ............... 709/226; 705/7; 718/104
(58) Field of Classification Search ............ 709/226; 705/7; 718/104
See application file for complete search history.

(56) References Cited

U.S. PATENT DOCUMENTS

| | | | |
|---|---|---|---|
| 5,023,873 A | 6/1991 | Stevenson et al. | 371/8.2 |
| 5,386,561 A | 1/1995 | Huynh et al. | |
| 5,452,452 A | 9/1995 | Gaetner et al. | |
| 5,481,694 A | 1/1996 | Chao et al. | 395/439 |
| 5,537,542 A | 7/1996 | Eilert et al. | |
| 5,604,863 A | 2/1997 | Allen et al. | |
| 5,631,831 A | 5/1997 | Bird et al. | |
| 5,652,908 A | 7/1997 | Douglas et al. | |
| 5,734,837 A | 3/1998 | Flores et al. | |
| 5,790,780 A | 8/1998 | Brichta et al. | |
| 5,797,005 A | 8/1998 | Bahls et al. | |
| 5,797,129 A | 8/1998 | Rohan | |
| 5,826,080 A | 10/1998 | Dworzecki | |
| 5,887,168 A | 3/1999 | Bahls et al. | |
| 6,012,044 A | 1/2000 | Maggioncalda et al. | |
| 6,012,152 A | 1/2000 | Douik et al. | |
| 6,041,306 A | 3/2000 | Du et al. | |
| 6,336,138 B1 | 1/2002 | Caswell et al. | |
| 6,385,613 B1 | 5/2002 | Grewell et al. | 707/8 |
| 6,393,386 B1 | 5/2002 | Zager et al. | |
| 6,393,485 B1 | 5/2002 | Chao et al. | |
| 6,408,277 B1 | 6/2002 | Nelken | |

(Continued)

FOREIGN PATENT DOCUMENTS

WO WO 99/10814 3/1999

OTHER PUBLICATIONS

Evans, James, "Optimization Algorithms for Networks and Graphs, Second Edition", 1992, CCR, ISBN 0824786025, Chapters 1-3 (pp. 1-76) and Chapter 11 (pp. 390-413).

(Continued)

*Primary Examiner* — Duyen Doan
(74) *Attorney, Agent, or Firm* — Dennis Jung, Esq.; Blanche E. Schiller, Esq.; Heslin Rothenberg Farley & Mesiti P.C.

(57) ABSTRACT

Management of an Information Technology (IT) environment is conditionally controlled based on runtime analysis of resource pairing constructs. Resource pairings are provided, and evaluated based on the current state of the environment. This real-time information is then used in performing managerial tasks, the results of which are effected by the runtime conditions.

23 Claims, 29 Drawing Sheets

U.S. PATENT DOCUMENTS

| | | |
|---|---|---|
| 6,449,688 B1 | 9/2002 | Peters et al. .................. 711/112 |
| 6,480,944 B2 | 11/2002 | Bradshaw et al. |
| 6,625,751 B1 | 9/2003 | Starovic et al. |
| 6,732,118 B2 * | 5/2004 | Hermann et al. ..................... 1/1 |
| 6,785,768 B2 | 8/2004 | Peters et al. .................. 711/112 |
| 6,862,696 B1 | 3/2005 | Voas et al. |
| 6,874,010 B1 | 3/2005 | Sargent |
| 6,934,247 B2 | 8/2005 | Bhattal et al. .................. 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 | 4/2006 | Gasser et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,313,573 B2 | 12/2007 | Leung et al. |
| 7,325,161 B1 | 1/2008 | Rakic et al. |
| 7,395,537 B1 | 7/2008 | Brown et al. |
| 7,409,356 B1 | 8/2008 | Geddes et al. |
| 7,437,611 B2 | 10/2008 | Agarwal et al. |
| 7,490,265 B2 | 2/2009 | Baskey et al. |
| 7,499,954 B2 | 3/2009 | Cherkauer et al. |
| 7,509,529 B2 | 3/2009 | Colucci et al. |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,627,728 B1 | 12/2009 | Roeck et al. |
| 7,650,341 B1 | 1/2010 | Oratovsky et al. |
| 7,707,173 B2 * | 4/2010 | Nanavati et al. ............... 707/608 |
| 7,730,363 B2 | 6/2010 | Takezawa et al. |
| 7,743,001 B1 | 6/2010 | Vermeulen et al. |
| 7,747,730 B1 * | 6/2010 | Harlow ......................... 709/224 |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 | 5/2003 | Cichowlas |
| 2003/0135384 A1 | 7/2003 | Nguyen |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0225602 A1 | 12/2003 | Hagmann et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0119752 A1 | 6/2004 | Beringer et al. |
| 2004/0143470 A1 | 7/2004 | Myrick et al. |
| 2004/0158777 A1 | 8/2004 | Bae et al. |
| 2004/0162741 A1 | 8/2004 | Flaxer et al. |
| 2004/0181476 A1 * | 9/2004 | Smith et al. ..................... 705/35 |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1 * | 3/2005 | Soares et al. .................. 715/810 |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 * | 5/2005 | Aiber et al. ....................... 705/7 |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 | 4/2006 | Pulamarasetti et al. |
| 2006/0106626 A1 | 5/2006 | Jeng et al. |
| 2006/0111921 A1 | 5/2006 | Chang et al. |
| 2006/0112383 A1 | 5/2006 | Chang et al. |
| 2006/0117221 A1 | 6/2006 | Fisher et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1 | 10/2006 | Schmidt et al. |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 * | 1/2007 | Morimoto et al. ............. 709/226 |
| 2007/0027734 A1 * | 2/2007 | Hughes ............................ 705/7 |
| 2007/0038490 A1 | 2/2007 | Joodi |
| 2007/0038492 A1 * | 2/2007 | Ryan et al. ........................ 705/8 |
| 2007/0067296 A1 | 3/2007 | Malloy et al. |
| 2007/0079097 A1 | 4/2007 | Karnowski et al. |
| 2007/0100712 A1 | 5/2007 | Kilpatrick et al. |
| 2007/0112847 A1 | 5/2007 | Dublish et al. |
| 2007/0143166 A1 | 6/2007 | Leymann et al. |
| 2007/0150571 A1 | 6/2007 | Haga et al. |
| 2007/0165525 A1 | 7/2007 | Kageyama |
| 2007/0179826 A1 | 8/2007 | Cutlip et al. |
| 2007/0198678 A1 * | 8/2007 | Dieberger et al. ............. 709/223 |
| 2007/0234408 A1 | 10/2007 | Burch et al. |
| 2007/0266029 A1 | 11/2007 | Baskey et al. |
| 2007/0271219 A1 | 11/2007 | Agarwal et al. |
| 2007/0276885 A1 | 11/2007 | Valiyaparambil et al. |
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 * | 1/2008 | Sadiq et al. .................... 718/101 |
| 2008/0016335 A1 | 1/2008 | Takahashi et al. |
| 2008/0052719 A1 * | 2/2008 | Briscoe et al. ................. 718/104 |
| 2008/0063423 A1 | 3/2008 | Matoba |
| 2008/0140495 A1 | 6/2008 | Bhamidipaty et al. |

| | | | |
|---|---|---|---|
| 2008/0215909 A1 | 9/2008 | Bretschneider et al. | |
| 2008/0294777 A1 | 11/2008 | Karve et al. | |
| 2008/0295100 A1 | 11/2008 | Ainsworth | |
| 2008/0317217 A1* | 12/2008 | Bernardini et al. | 379/32.03 |
| 2009/0037363 A1* | 2/2009 | Kozlov et al. | 707/1 |
| 2009/0077210 A1 | 3/2009 | Musman et al. | |
| 2009/0125751 A1 | 5/2009 | Dawson et al. | |
| 2009/0150456 A1 | 6/2009 | Balasubramanian et al. | |
| 2009/0150887 A1 | 6/2009 | Sanghvi et al. | |
| 2009/0171703 A1 | 7/2009 | Bobak et al. | |
| 2009/0171704 A1 | 7/2009 | Bobak et al. | |
| 2009/0171705 A1 | 7/2009 | Bobak et al. | |
| 2009/0171706 A1 | 7/2009 | Bobak et al. | |
| 2009/0171707 A1 | 7/2009 | Bobak et al. | |
| 2009/0171708 A1 | 7/2009 | Bobak et al. | |
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172470 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172682 A1 | 7/2009 | Bobak et al. | |
| 2009/0172687 A1 | 7/2009 | Bobak et al. | |
| 2009/0172688 A1 | 7/2009 | Bobak et al. | |
| 2009/0172689 A1 | 7/2009 | Bobak et al. | |
| 2009/0172769 A1 | 7/2009 | Bobak et al. | |
| 2009/0249337 A1 | 10/2009 | Vasilevsky et al. | |
| 2010/0280863 A1 | 11/2010 | Wilcock et al. | |
| 2011/0004564 A1 | 1/2011 | Rolia et al. | |

OTHER PUBLICATIONS

Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
"BPEL Project", http://www.eclipse.org/bpel/.
"Factor Analysis Using SAS Proc Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "Java and JMX—Building Manageable Systems," Jan. 2003; ISBN 0672324083; pp. 54-64.
Office Action for U.S. Appl. No. 11/966,495 dated Oct. 29, 2009.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/965,855 dated Apr. 30, 2010.
Final Office Action for U.S. Appl. No. 11/966,495 dated May 14, 2010.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Final Office Action for U.S. Appl. No. 11/965,897 dated Sep. 17, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13.
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339.
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,930 dated Sep. 29, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
U.S. Appl. No. 12/975,520, filed Dec. 22, 2010 entitled "Real-Time Information Technology Environments".
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Office Action for U.S. Appl. No. 11/965,894 dated Jul. 18, 2011.
Final Office Action for U.S. Appl. No. 11/965,926 dated Jul. 19, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.

Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,845 dated Apr. 18, 2012.
Office Action for U.S. Appl. No. 11/965,922 dated Apr. 20, 2012.
Crawford et al., "Toward an on Demand Service-Oriented Architecture," IBM Systems Journal, vol. 44, No. 1, 2005.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.

* cited by examiner

FIG. 6A

| MESSAGE | RESOURCE | DATE |
|---|---|---|
| ! CONTAINMENT REGION HAS RECOVERED | CONTAINMENT1 | APR 18, 2006 10:50:52.193 |
| X CONTAINMENT REGION CREATED FOR RESOURCE FAILURE | CONTAINMENT1 | APR 18, 2006 10:50:52.103 |
| ! CONTAINMENT REGION HAS RECOVERED | CONTAINMENT3 | APR 18, 2006 10:50:51.982 |
| X DETECTED DYNAMIC MEMBERSHIP CHANGE ACTIVE POLICY REED_ | RECOVERYSEGMENT2 | APR 18, 2006 10:12:25.696 |
| X THIS RESOURCE HAS ENTERED AN UNRECOVERABLE STATE AND RED_ | RECOVERY MANAGER2 | APR 18, 2006 10:12:25.696 |
| X THIS RESOURCE HAS ENTERED AN UNRECOVERABLE STATE AND RED_ | RECOVERY MANAGER1 | APR 18, 2006 10:12:14.770 |
| X ACTIVATION OF POLICY XYZ HAS FAILED | RECOVERY SEGMENT1 | APR 18, 2006 10:12:14.760 |
| ! DETECTED DYNAMIC MEMBERSHIP CHANGE ACTIVE POLICY REED | RECOVERY SEGMENT2 | APR 18, 2006 10:10:25.696 |

? THE RESOURCE 'ODER 1 RECOVERY' HAS ENTERED AN UNRECOVERABLE STATE THAT REQUIRES YOUR INPUT. DO YOU WANT TO OPEN THE RESOURCE NOW?

[YES]  [NO]

650

US 8,346,931 B2

CONDITIONAL COMPUTER RUNTIME CONTROL OF AN INFORMATION TECHNOLOGY ENVIRONMENT BASED ON PAIRING CONSTRUCTS

TECHNICAL FIELD

This invention relates, in general, to managing customer environments to provide support for business resiliency, and in particular, to providing and employing resource pairing information to manage the environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability that facilitates management of an IT environment. For example, a need exists for a capability that enables the management to be conditionally controlled based on runtime analysis of the environment. In one particular example, a need exists for a capability that enables conditional management of the environment based on runtime analysis of pairing constructs.

The shortcomings of the prior art are overcome and additional advantages are provided through the provision of a computer-implemented method to facilitate management of an Information Technology (IT) environment. The method includes, for instance, evaluating at runtime one or more pairing constructs usable in managing the IT environment; and conditionally controlling management of the IT environment based on the runtime evaluation of at least one pairing construct of the one or more pairing constructs.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
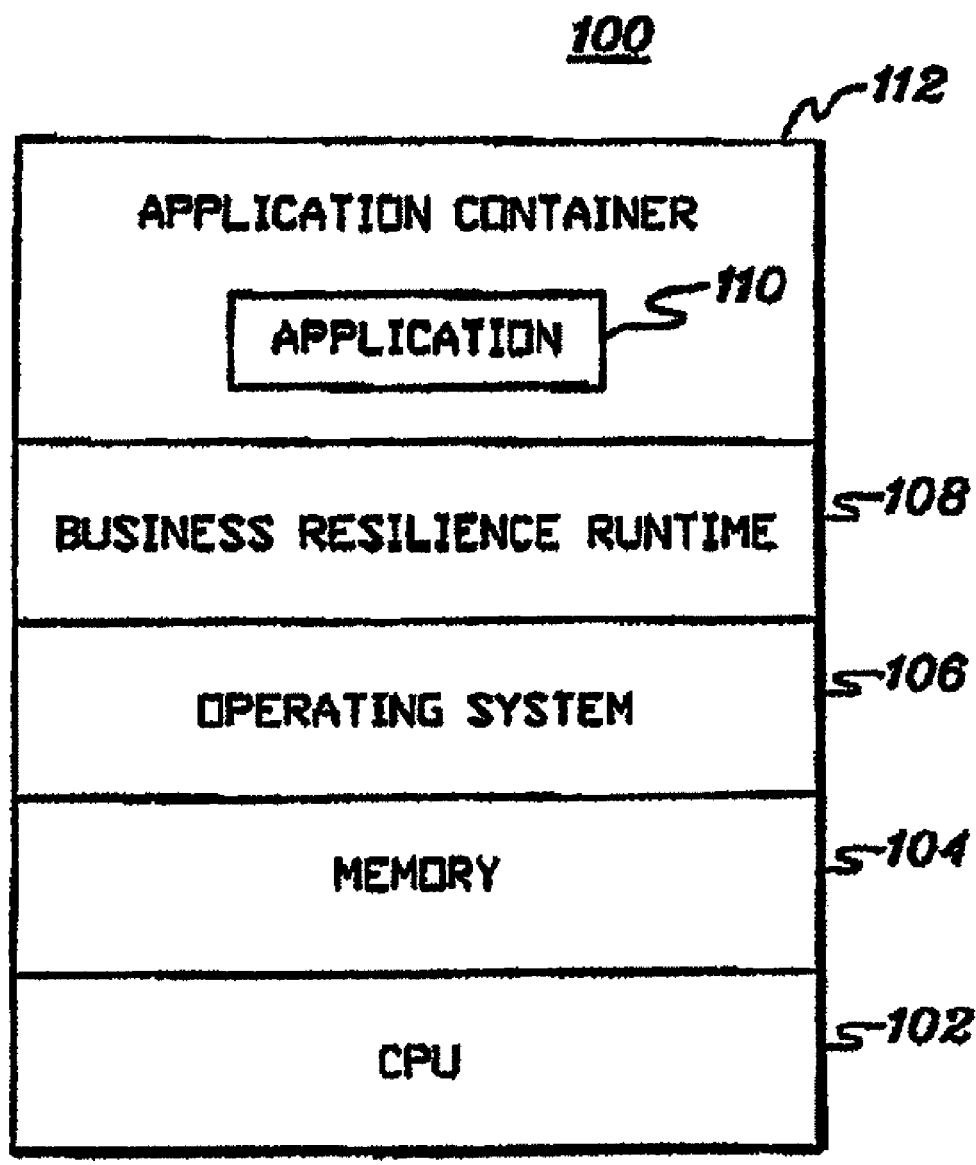
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).

2. Ability to group together mixed resource types (servers, storage, applications, subsystems, network, etc.) into logical groupings aligned with business processes requirements for availability.

3. Ability to share resources across logical groups of resources; ability to nest these logical group definitions, with specifications for goal policy accepted and implemented at each level.

4. Pre-specified recommendations for resource groupings, with customization possible, and pattern matching customer configuration with vendor or customer provided groupings/relationships—to avoid requiring customers to start from scratch for definitions.

5. Ability to group together redundant resources with functional equivalence—use during validation when customer has less redundancy than required to meet the Recovery Time Objective (RTO) goal; in recovery to select an alternate resource for one that has failed.

6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.

7. Ability to relate the redundancy capability of relevant resources to the availability status of a business application.

8. Allow customers to configure when recovery actions can be delegated to lower level resources, particularly since resource sharing is becoming more relevant in many customer environments.

9. Include customer or vendor best practices for availability as prespecified workflows, expressed in a standards based manner, that can be customized.

10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.

11. Decomposition of the overall quantified RTO goal to nested logical groups; processing for shared groups having different goals.

12. Ability to configure redundancy groupings and co-location requirements with resources from other vendors, using a representation for resources (which may be, for example, standards based), with ability to clearly identify the vendor as part of the resource definition.

13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.

14. Specification of statistical thresholds for acceptability of using historical information; customer specification directly of expected operation times and directive to use customer specified values.

15. Environments are matched to IT operations and time of day, with automatic processing under a new system environment at time boundaries—no automatic internal adjustment of RTO is to be allowed, rather changed if the customer has specified that a different RTO is needed for different system environments.

16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:
   What is my expected recovery time for a given application during "end of month close" system environment?
   What is the longest component of that recovery time?
   Can I expect to achieve the desired RTO during the "market open" for stock exchange or financial services applications?
   What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question:
   What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.

19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).

7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
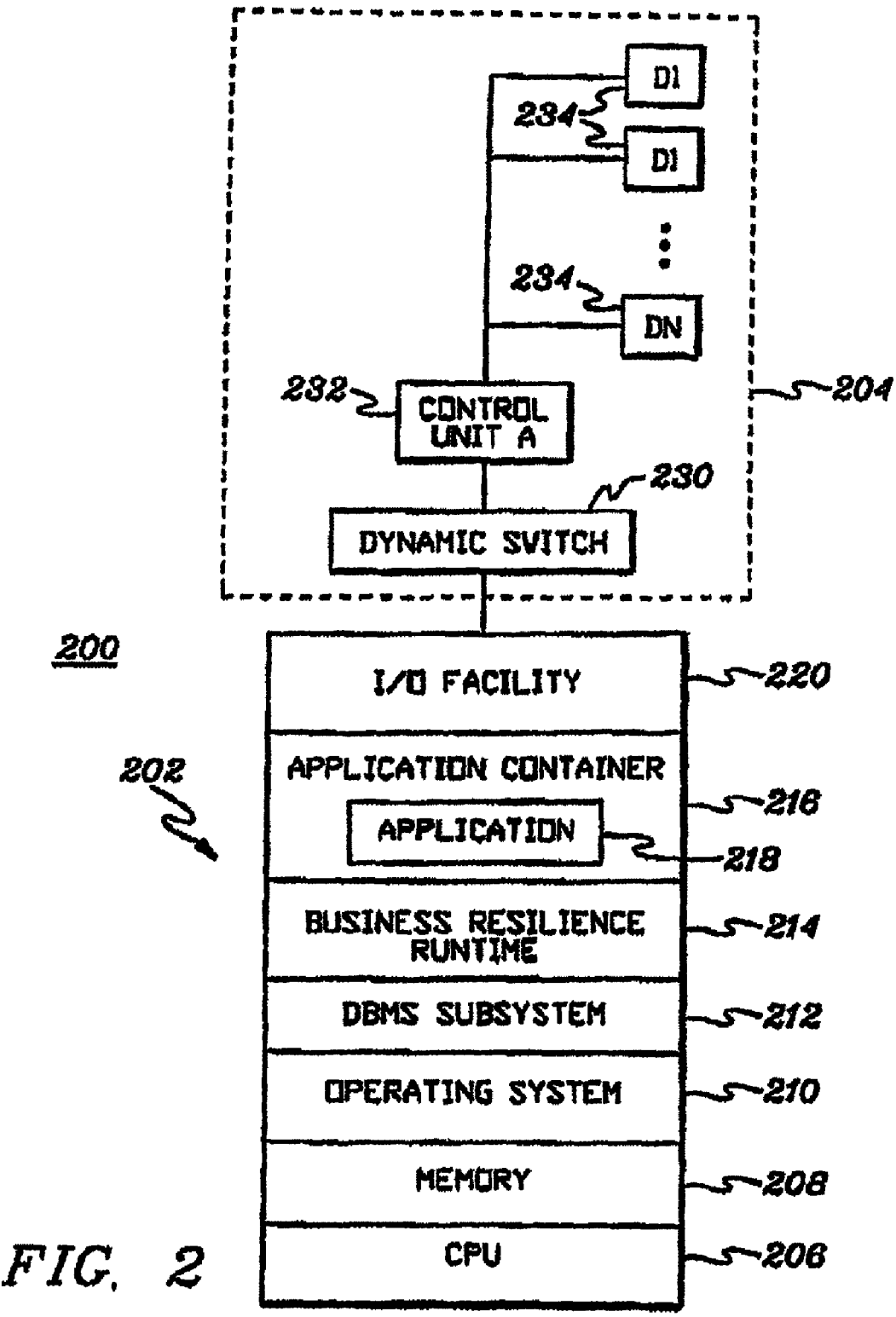
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
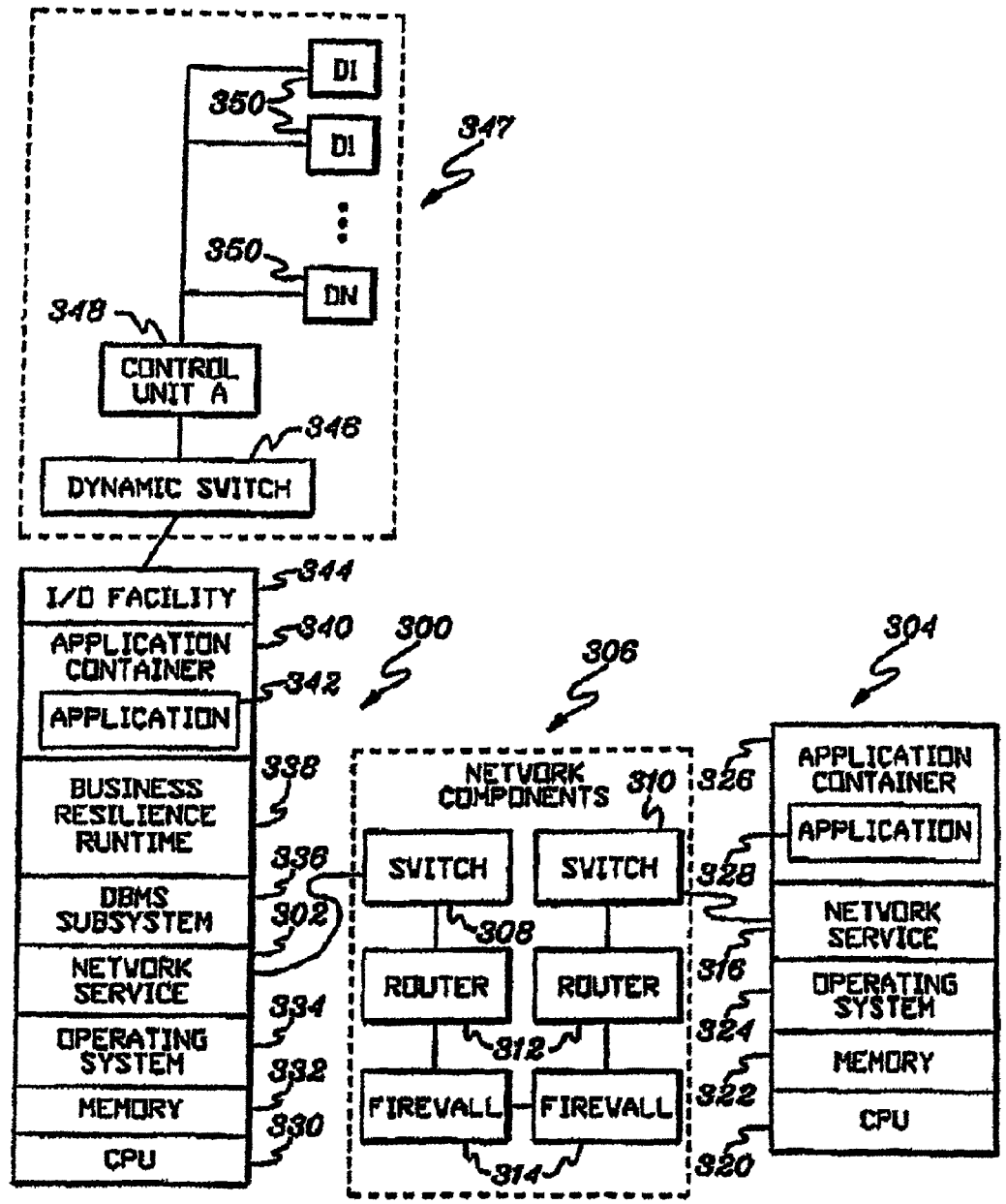
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
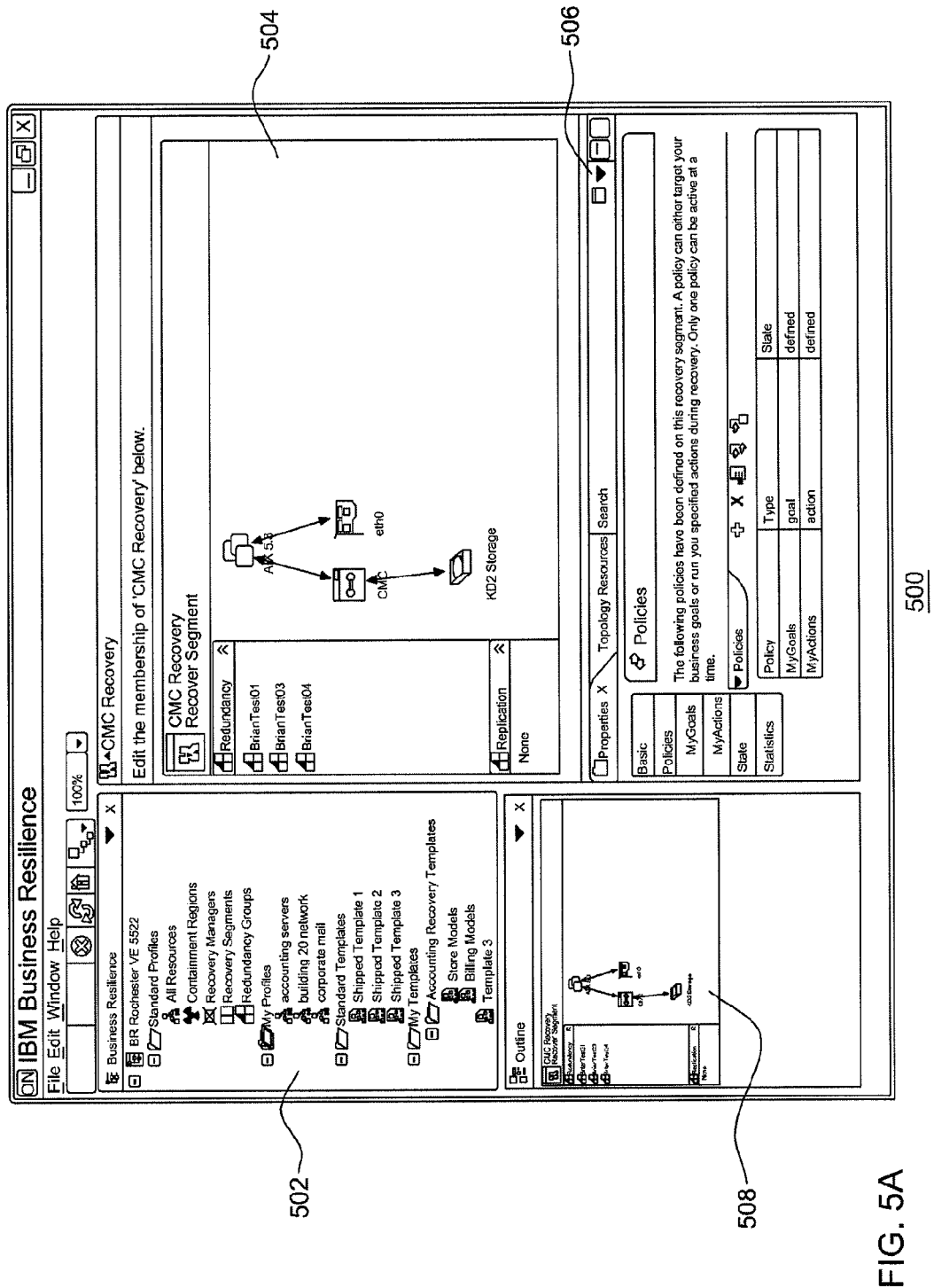
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
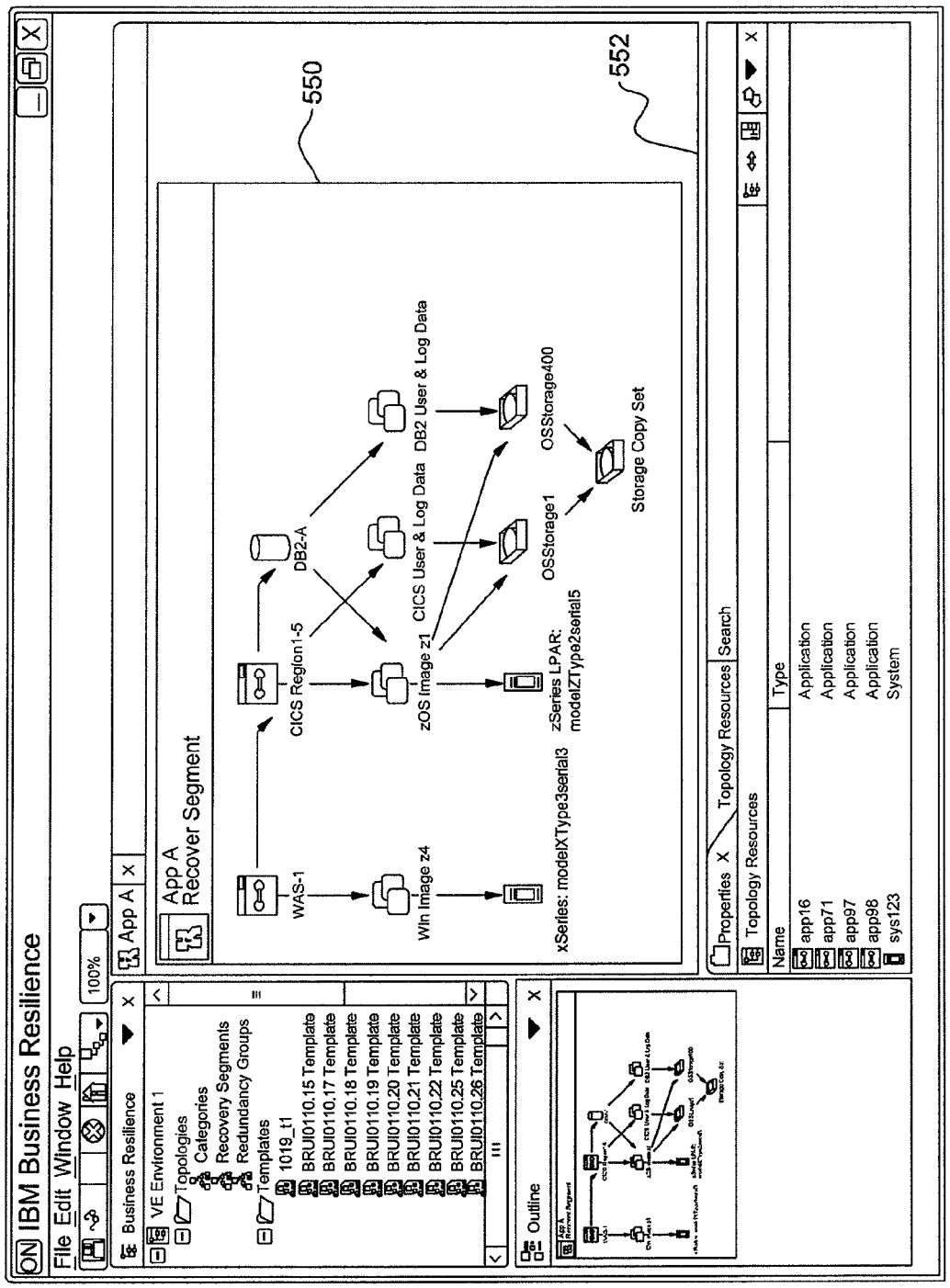
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
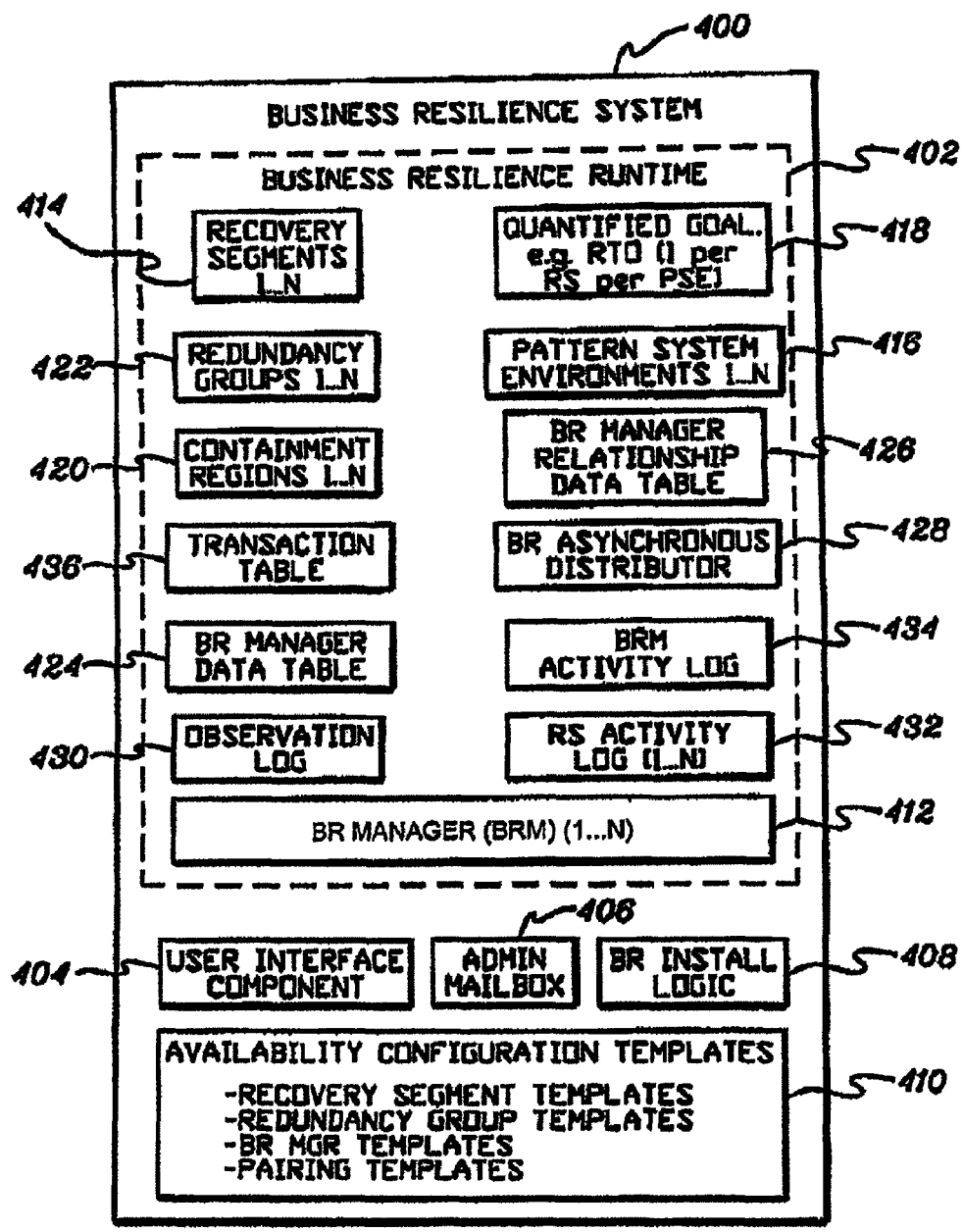
FIG. 4 depicts one embodiment of a Business Resilience System used in accordance with an aspect of the present invention.

BR Admin Mailbox (406) (FIG. 4).
  The BR Admin (or Administrative) Mailbox is a mechanism used by various flows of the BR runtime to get requests to an administrator to take some action. The Admin mailbox periodically retrieves information from a table, where BR keeps an up-to-date state.
  As an example, the Admin Mailbox defines a mechanism where BR can notify the user of important events needing user attention or at least user awareness. The notifications are stored in the BR database so they can be recorded while the UI is not running and then shown to the user during their next session.
  The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.
  Double clicking a notification opens an editor on the corresponding resource within the BR UI, which surfaces the available properties and operations the user may need to handle the notification.
  The user is able to configure the UI to notify them whenever a notification exceeding a certain severity is encountered. The UI then alerts 650 the user of the notification and message when it comes in, as shown in FIG. 6B, in one example.
  When alerted, the user can choose to open the corresponding resource directly. If the user selects No, the user can revisit the message or resource by using the above notification log view.
BR Install Logic (408) (FIG. 4).
  The BR Install logic initializes the environment through accessing the set of preconfigured template information and vendor provided tables containing resource and relationship information, then applying any customizations initiated by the user.
Availability Configuration Templates (410):
  Recovery Segment Templates
    The BR System has a set of Recovery Segment templates which represent common patterns of resources and relationships. These are patterns matched with each individual customer environment to produce recommendations for RS definitions to the customer, and offer these visually for customization or acceptance.
  Redundancy Group Templates
    The BR System has a set of Redundancy Group templates which represent common patterns of forming groups of redundant resources. These are optionally selected and pattern matched with each individual customer environment to produce recommendations for RG definitions to a customer.
  BR Manager Deployment Templates
    The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.
  Pairing Templates
    The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
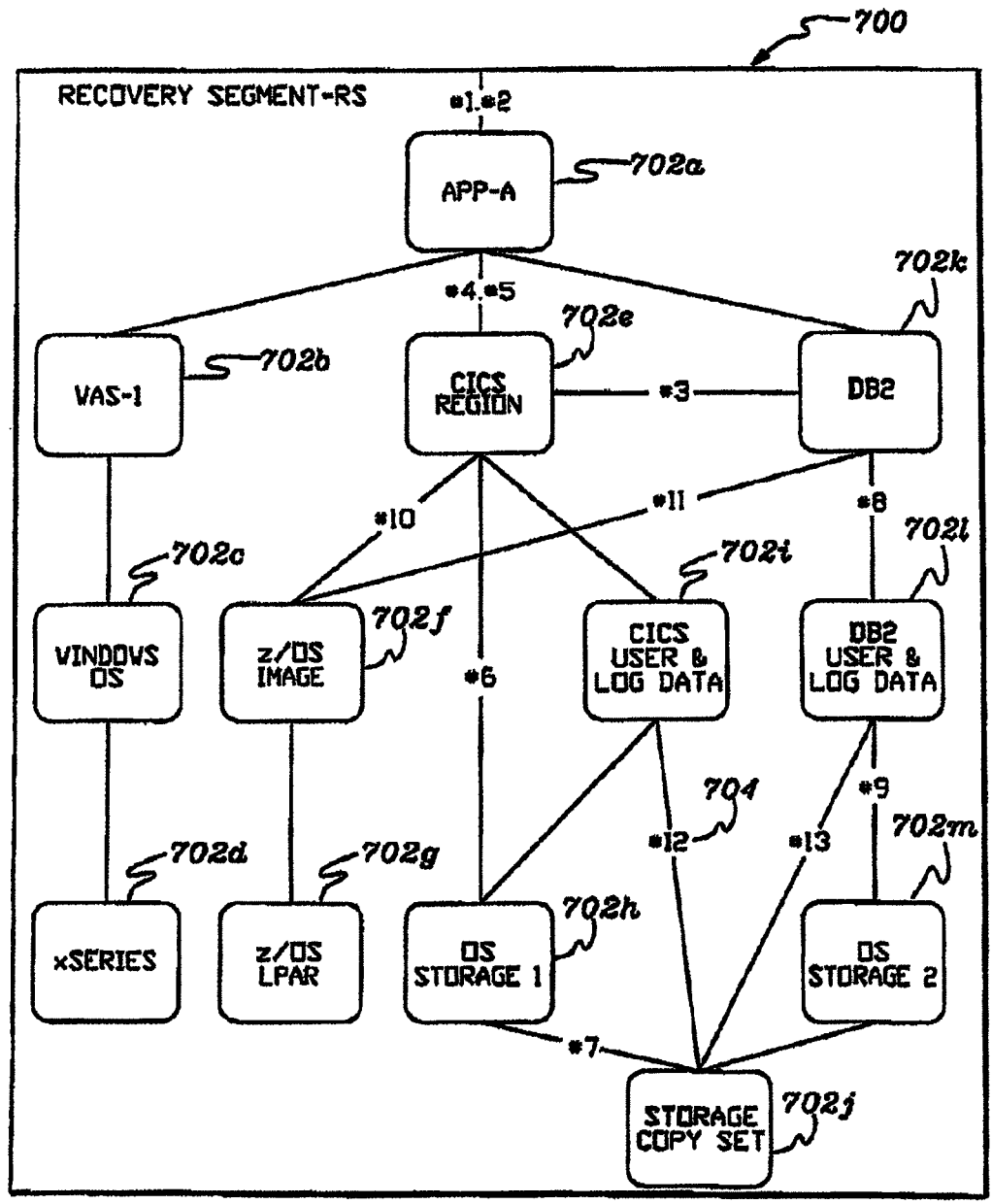
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:
  The Recovery Segment RS has been defined associated with an instantiated and deployed BR Manager for monitoring and management.
  Relationships have been established between the Recovery Segment RS and the constituent resources 702a-702m.
  A goal policy has been defined and validated for the Recovery Segment through interactions with the BR UI.
  The following impact pairings have been assigned to the resources and relationships:

| Rule | Resource #1 | State | Resource #2 | State |
| --- | --- | --- | --- | --- |
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.
Observation mode for the resources in the Recovery Segment has been initiated either by the customer or as a result of policy validation.
The environment has been prepared as a result of that goal policy via policy validation and the possible creation and execution of a preparatory workflow.
The goal policy has been activated for monitoring by BR.
As a result of these conditions leading up to runtime, the following subscriptions have already taken place:
  The BRM has subscribed to runtime state change events for the RS.
  RS has subscribed to state change events for the constituent resources.
These steps highlight one example of an error detection process:
  The OSStorage-1 resource 702h fails (goes Unavailable).
  RS gets notified of state change event.
  $1^{st}$ level state aggregation determines:
    Storage Copy Set→Degraded
    CICS User & Log Data→Degraded
    DB2 User & Log Data→Degraded
    DB2→Degraded CICS→Unavailable
App-A→Unavailable
1<sup>st</sup> level state aggregation determines:
RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpeli/ http://www.parasoft.com/jsp/products/home.jsp;jessionid=aaa56iqFywAHJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
- RS definition from representation of IT Resources;
- Goal (RTO) and action policy specification, validation and activation; and
- Tooling by Eclipse, as an example, to integrate with IT process management.

Rapid, flexible, administrative level:
- Alteration of operation escalation rules;
- Customization of workflows for preparatory and recovery to customer goals;
- Customization of IT resource selection from RG based on quality of service (QoS);
- Alteration of definition of IT resource and business application state (available, degraded, or unavailable);
- Customization of aggregated state;
- Modification of topology for RS and RG definition;
- Selection of BR deployment configuration;
- Alteration of IT resource recovery metrics;
- Customization of generated Pattern System Environments; and
- Specification of statistical tolerances required for system environment formation or recovery metric usage.

Extensible framework for customer and vendor resources:
- IT resource definitions not specific to BR System; and
- Industry standard specification of workflows, using, for instance, BPEL standards.

Adaptive to configuration changes and optimization:
- IT resource lifecycle and relationships dynamically maintained;
- System event infrastructure utilized for linkage of IT resource and BR management;
- IT resource recovery metrics identified and collected;
- IT resource recovery metrics used in forming Pattern System Environments;
- Learned recovery process effectiveness applied to successive recovery events;
- System provided measurement of eventing infrastructure timing;
- Dynamic formation of time intervals for aggregation of related availability events to a root cause; and
- Distribution of achieved recovery time over constituent resources.

Incremental adoption and coexistence with other availability offerings:
- Potential conflict of multiple managers for a resource based on IT representation;
- Workflows for recovery and preparatory reflect operations with meta data linked to existing operations;
- Advisory mode execution for preparatory and recovery workflows; and
- Incremental inclusion of resources of multiple types.

Support for resource sharing:
- Overlapping and contained RS;
- Merger of CR across RS and escalation of failure scope; and
- Preparatory and recovery workflows built to stringency requirements over multiple RS.

Extensible formalization of best practices based on industry standards:
- Templates and patterns for RS and RG definition;
- Preparatory and recovery workflows (e.g., BPEL) for customization, adoption; and
- Industry standard workflow specifications enabling integration across customer and multiple vendors.

Integration of business resilience with normal runtime operations and IT process automation:
- Option to base on IT system wide, open industry standard representation of resources;
- BR infrastructure used for localized recovery within a system, cluster and across sites; and
- Utilization of common system infrastructure for events, resource discovery, workflow processing, visualization.

Management of the IT environment is adaptively performed, as described herein and in a U.S. patent application "Adaptive Business Resiliency Computer System for Information Technology Environments," (Ser. No. 11/966,495), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (Ser. No. 11/965,855), Bobak et al., which is hereby incorporated herein by reference in its entirety.

Definition of a RS may use a representation of resources in a topology graph as described in "Use of Graphs in Managing Computing Environments," (Ser. No. 11/965,906), Bobak et al, which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (Ser. No. 11/965,877), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (Ser. No. 11/965,832), Bobak et al., which is hereby incorporated herein by reference in its entirety.

Representations for the IT environment in which BR is to operate may be created from historical information captured during observation mode, as described in "Computer Pattern System Environment Supporting Business Resiliency," (Ser.

No. 11/965,851), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described herein, in accordance with one or more aspects of the present invention. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (Ser. No. 11/966,619), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (Ser. No. 11/965,978), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (Ser. No. 11/965,894), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (Ser. No. 11/965,951), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (Ser. No. 11/965,930), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (Ser. No. 11/965,838), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (Ser. No. 11/965,902), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (Ser. No. 11/965,917), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (Ser. No. 11/965,862), Bobak et al., which is hereby incorporated herein by reference in its entirety.

Formulation of a recovery plan is to uphold customer specification regarding the impact recovery operations can have between different business applications, as described in "Managing Execution Within a Computing Environment," (Ser. No. 11/965,913), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (Ser. No. 11/965,897), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (Ser. No. 11/965,899), Bobak et al., which is hereby incorporated herein by reference in its entirety.

Use of provided templates representing best practices in defining the BR system, as described in "Defining and Using Templates in Configuring Information Technology Environments," (Ser. No. 11/965,845), Bobak et al, which is hereby incorporated herein by reference in its entirety.

Use of provided templates in formulation of workflows, as described in "Using Templates in a Computing Environment," (Ser. No. 11/965,922), Bobak et al., which is hereby incorporated herein by reference in its entirety.

Making changes to the availability goals while supporting ongoing BR operation, as described in "Non-Disruptively Changing a Computing Environment," (Ser. No. 11/965,926), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (Ser. No. 11/965,889), Bobak et al., which is hereby incorporated herein by reference in its entirety.

Detecting and recovery for the BR system is performed non-disruptively, as described in "Managing Processing of a Computing Environment During Failures of the Environment," (Ser. No. 11/965,872), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |

-continued

| Resource Type | Property | Value Range |
|---|---|---|
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, |

-continued

| Resource Type | Property | Value Range |
|---|---|---|
| | | log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |

-continued

| Resource Type | Property | Value Range |
|---|---|---|
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
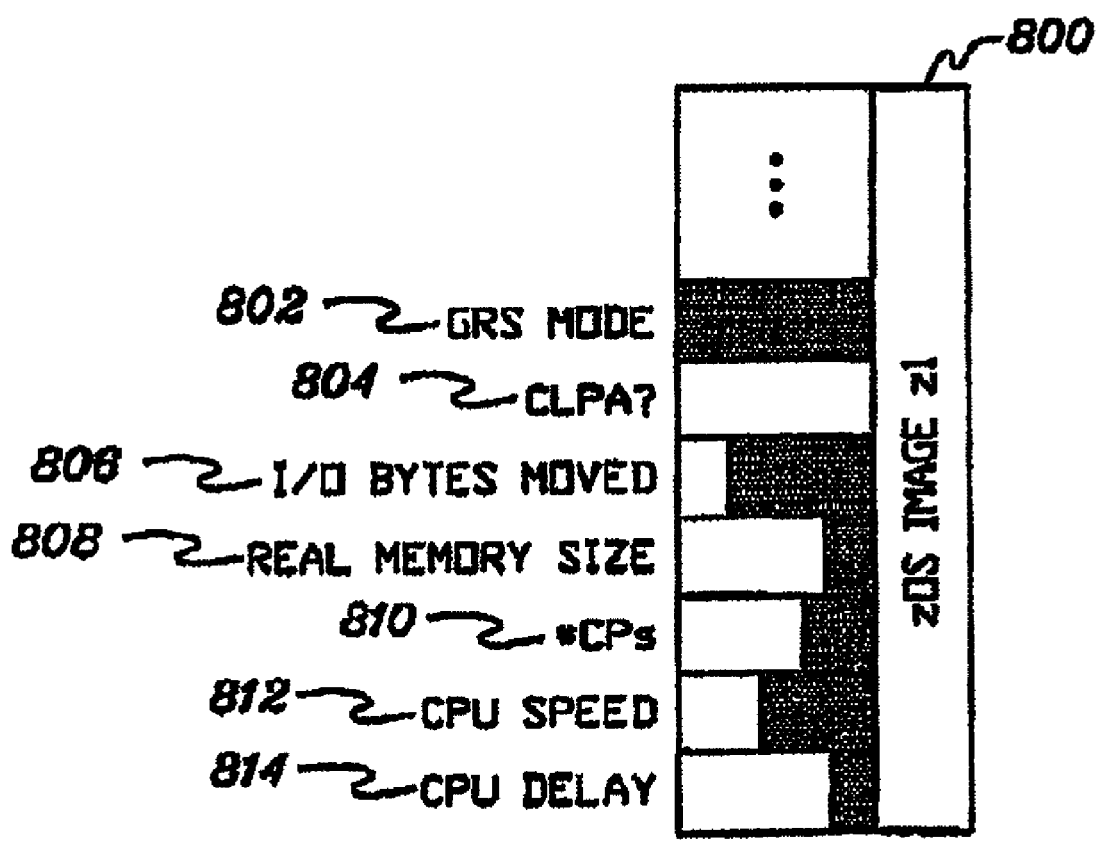
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
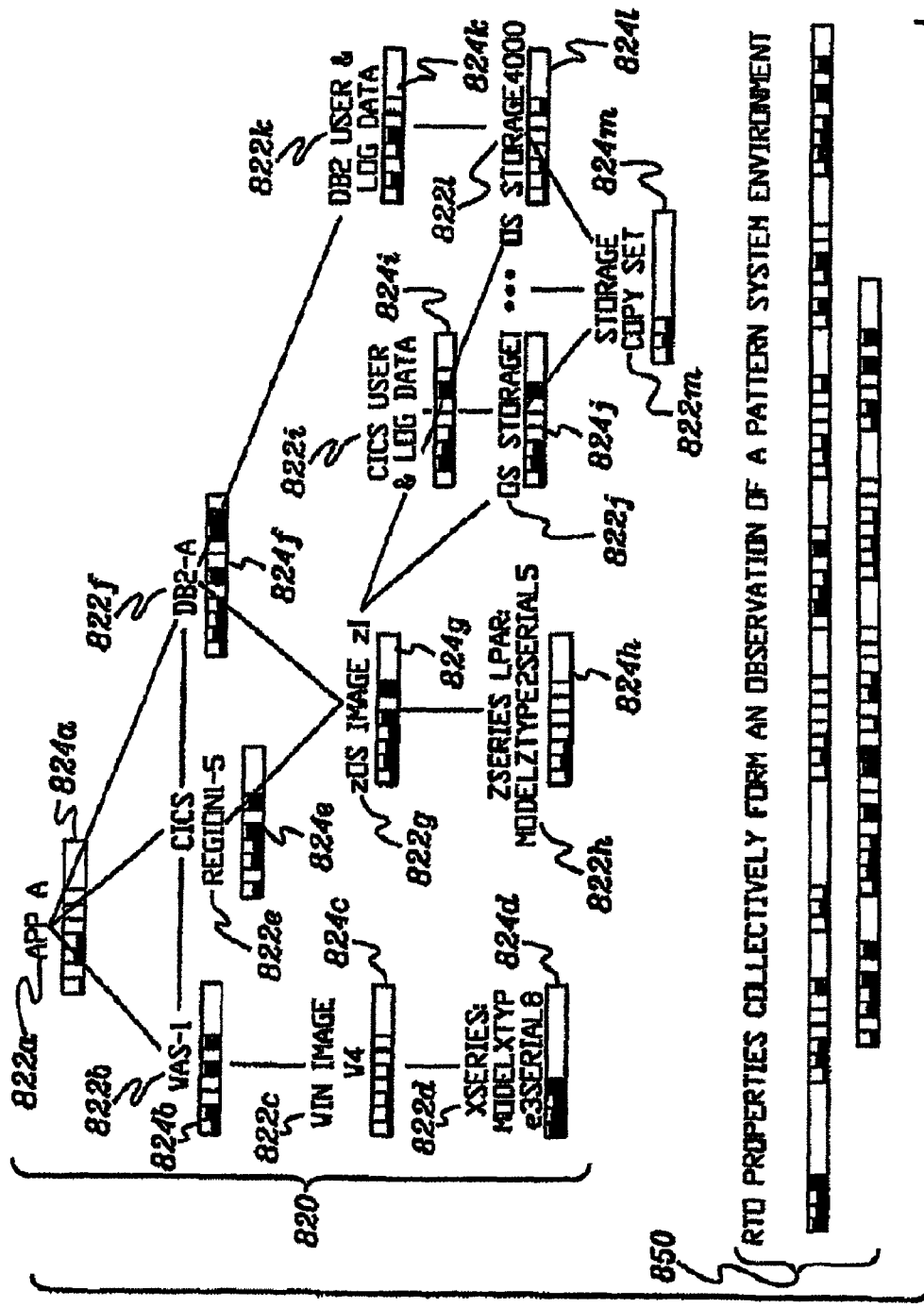
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
Are present to understand impacts on managed resources.
No decomposed RTO is associated with an assessed resource.
They are resources on which resources managed by BR depend upon, but are not directly acted on for availability by BR.
They are resources removed (or not explicitly added) from the actively monitored set of resources by the BR admin during RS definition.
They are resources that BR does not try to recover and BR thus will not invoke any preparatory or recovery operations on them.

Similarly, there are likely scenarios where a resource exists in a customer environment that already has an alternative availability management solution, and does not require BR

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.
The operational state of the resource at which the observed recovery time interval ended.
The operational states of the resource at which point it can unblock dependent resources (example: operational states at which a DB2 could unblock new work from CICS, at which it could allow processing of logs for transactions ongoing at time of failure . . . ).
Values of statistical thresholds to indicate sufficient observations for goal managing the resource (number of observations, max standard deviations, confidence level).

In addition to the resources defined herein as part of the IT configuration that is managed, there are other resources, for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.
The RS subscribes to state change notifications for assessed resources (and possibly other notifiable properties).
Relationships between observed and managed resources are possible (and likely).
BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, management of an IT environment is facilitated by employing resource pairing information that establishes relationships between different resources of the environment. In particular, management of the IT environment is conditionally controlled by runtime analysis of pairing constructs and trigger conditions. Further information regarding pairings, trigger conditions and their use are described below. (Trigger, set of conditions and conditions are used synonymously herein.)

The BR system maintains BR-specific internal information related to the pairings of resources it interacts with, and each entry in the BR-specific Relationship Data (BRRD) table represents an instance of such a pairing. The pairing record identifies the resources that participate in the pairing, and resources can be any of those that appear in the BRMD, e.g., resource instances, BR internal resources, and/or BR externally exposed resources. The BRRD includes information about operation ordering across resources; failure, unavailable and degradation impact across resources; effects of operations on one resource to another; affinity and negative affinity among resources; and effects of preparatory operations and constraints to be enforced on the impact of recovery for one business application or other business applications, as examples.

Information reflected in pairings enable, for instance:

Description of the effect an operation on one resource can have on the same or another resource;

Definition of the ordering of operations on one resource or between two resources;

Definition of the resulting degraded, failed or unavailable state on a resource based on the state of a second resource;

Definition of the requirements for residing on the same computer system or on the same operating system image for two or more resources;

Definition of a default behavior that can be tied to the type of resources and the relationships they participate in;

Definition of the impact recovery of a business application can have on other business applications;

Ability to tailor individual resource pairings at an instance level to define operation effect, impact of change in state, ordering of operations and requirements for co-location of resources on servers; and Ability to determine effects of pairings based on real-time analysis of IT computing resources using a type or instance of pairing occurrences.

In one example, pairings follow a common structure regardless of their use. For each pairing, there exists four major sections of its specification:

1. A first resource;
2. A directive;
3. A second resource; and
4. A set of conditions, each of which is described below.

A first resource is identified and may be any type of resource recognized within the environment. The specification may be further qualified by definition of an operation on the resource, a property and associated value of the resource or a state and associated value of the resource. In the BR parings described below, a first resource is specified as, for instance:

a. Resource;
   b. Resource and resource operation;
   c. Resource and property, value; and
   d. Resource and state, value.

Directives are unique to each pairing type and declare the alteration caused to the second resource. Directives reflected in the BR pairings described below include, for instance:

a. Ordering of operations—after, before;
   b. Impact of resource property having a value set—degrades, makes_unavailable, fails;
   c. Operation effect—sets;
   d. Co-location of resources—attracts, repels;
   e. Preparatory operation effect—effects; and
   f. Constraint—can, cannot.

The second resource can be any resource instance supported in the environment. It is the resource on which the directive acts. The specification may be further qualified by definition of an operation on the resource. In the BR pairings described below, a second resource is specified as, for example:

a. Resource;
   b. Resource and resource operation;
   c. Resource and state; and
   d. Resource and state, value.

A set of conditions may optionally be associated with a pairing. The set of conditions enables the runtime characteristics of the environment to be used in evaluating whether or not the pairings are actively enforced.

Across the runtime environment, there are a number of cases where there is information related to pairings of resources and operations on resources that BR will use to assess impact, create workflows and make decisions about tradeoffs. This information is employed by BR to achieve the requirements that customers have submitted for recoveries of complex environments that have a large set of interdependencies across resources and operations. Further, there have been a number of requirements received from customers that indicate the assessment of the information across these pairings is dynamic to the current environment, rather than statically defined to be true across each instance of a given pairing of resources and across all time and changes to the runtime environment.

This information is described as BR Relationship Data (BRRD), and specifically, there are several uses for this information, including, for instance:

1. Use for operational ordering across resources that is to be followed when constructing workflows. (Example, Operating System-B hosting a CICS is to start prior to CICS Region10 starting.)
2. Declaration of the impact of one resource on another where the effect on the second resource is degraded, makes unavailable or failed. (Example, Degradation in DB2-A fails CICS Region4.)
3. Declaration of impact on one resource's state when an operation occurs on a given resource.
4. Co-location requirements indicating when resources should be hosted on the same container, or when they should not. (Example, Resource A attracts Resource B.)
5. Prep Effect indicating that a given preparatory operation has an impact on a given recovery action, in terms of its execution time. (Example, initiating a flash copy (fc) replication session has an impact on switch to fc replica.)
6. Limitation or acceptance of degraded or failure caused to a business application resulting from the recovery of another application.

The following design points, as examples, are enforced for the pairing data:

Administrator builds/modifies the pairing data prior to activation.

Changing the data for these resources pairings is allowed, specifically:

Changing existing information (e.g., trigger conditions).
   Creating new pairings.
   Deleting existing information.

Not all resources and operations have pairing information.

This information can exist for pairings between various categories of resources:

Resource-Resource (Res-Res)
   AssessedResource-Resource (ARes-Res)
   BR Manager-Recovery Segment (BRM-RS)
   BRManager-Containment Region (BRM-CR)
   Recovery Segment-Redundancy Group (RS-RG)
   Recovery Segment-Recovery Segment (RS-RS).

In one implementation, there may be a set of indicators for the pairing that state whether one or more of (e.g., ordering, impact and operation effect) rules matter to the pairing.

In one implementation, there may be a set of indicators for the pairing to indicate whether it is used in composed resource state assessment or aggregated Recovery Segment assessment.

Triggers for when the information is used is to be specified, and is to include ability to factor in 'current operating state' because a given trigger may not be applicable at all times.

For example, a customer may want to take different actions depending on the characteristics of the business application and PSE.

Operation Ordering

There is information about resource pairings that is used for ordering of operations across resources, and this information is to be considered in generating workflows. The ordering can be used at generation of preparatory, preventive, or recovery workflows to specify, for instance:

Functional ordering—where if resource A, operation 2 is included, it is to occur after resource B, operation 1.
Example: if starting CICS regions, ensure that the hosted OS is started.
Recovery domino effects—where a given recovery operation on Resource A may require other resources and actions to be triggered.
Example: If invoking hyperswap on storage for critical CICS regions, issue a network freeze to avoid the regions from becoming short on storage during the hyperswap pause.

These types of rules about the handling of dependencies are expected to employ a conditional expression of when they should be exercised. In the example above, the rule for pausing network operations prior to a storage operation should only be triggered in times of recovery. In some cases, since operations can fall into multiple categories (prep, recovery, etc.), BR is to use the runtime state of the environment to assess whether there is a current recovery in progress.

In addition, staff operations (e.g., operations performed by employees, etc.) can be incorporated into the ordering dependencies by creating pairing information between the Staff resource and other IT resource operations.

Syntax of Ordering Rules

For those operations that are part of an ordering sequence, the set of rules to represent operation ordering is, for instance, as follows (on a BRRD entry):
Resource.operation ordering-directive Resource.operation set-of-conditions
Resource.operation
The Resource can be any resource instance, including, for example, those supported for servers, network, BR specific resources, such as Recovery Segments, or the 'BR Staff' resource.
Operations are those supported on the specified resource.
Each resource instance referenced here has an entry in the BRMD table, with use of foreign keys for referential integrity.
The ordering-directive
Is the precedence indication.
Supported directives include, for example: after, before.
The implementation of operation ordering maximizes parallelism of operations within the constraints of operation ordering pairings. An alternative implementation could utilize immediately_before and immediately_after directives in addition to the after and before directives to advise the operation ordering process to place two operations immediately adjacent. Other directives may also be used in lieu of or in addition to those above.
Examples:
cics_r1.start after db2_s1.start replication_session.
hyperswap after connectivity.freeze.
Set-of-conditions
Is the set of expressions of when this ordering is to be evaluated for validity.

Impact Assessment

Information on pairings can also be used to specify impact of one resource on another in terms of degradation or impact.

When an error or state change of a resource is received by BR, the RS assesses state. In addition, related resources that have not yet failed are evaluated for impact.

The information for the initial set of impact pairing templates is based on the information on dependency of relationships based on best practices as experienced by those in management of IT resources. Similar to the other pairing rules, the customer can apply these templates, and are to inspect, modify and accept or reject the recommendations explicitly.

Resource providers define the operations and states supported. Either through programmatic expression or written documentation, the lifecycle for a resource, the state at each phase of the lifecycle and the one or more operations which transition the resource between states are defined. The vendor providing the resource, the customer utilizing the resource or, for some other resources, the BR system provides for formalizing the resource state and operation data.

There exists a set of relationships among resources that are expressed either by resource owners or customers. The relationships may be formalized by BR for a set of resources. The relationships are reflected in formation of the one or more DAG(s) used in formation of Recovery Segments. From the relationships below, suggested impact relationships are formed during Recovery Segment definition.

| Relationship Type | Relationship combinations |
| --- | --- |
| Dependency | Implies degraded for (Res, Dependent) Dependency for failure or degraded of (Res, Antecedent) (1) |
| | Implies neither failure or degraded for (Res, Antecedent) |
| | Dependency for failure or degraded of (Res, Dependent) |
| HostedDependency | Implies failure (Res, Dependent) HostedDependency for failure of (Res, Antecedent) |
| | Implies degraded (Res, Dependent) HostedDependency for degraded of (Res, Antecedent) |
| | Implies neither failure or degraded (Res, Antecedent) HostedDependency for failure or degraded of (Res, Dependent) |

1. Degraded as default and customer makes impact assessment paring if failure is desired.

There are different categories of state changes which can impact other resources in some way, and each is to be considered in composing a list of impacted resources. For instance:
Failure of a strict functional dependency. Example:
ComputerSystem Hosts OperatingSystem, where ComputerSystem fails.
Degradation of a functional dependency. Example:
OperatingSystem Hosts DB2, where OperatingSystem degrades.
Failure of a non-functionally dependent resource. Example:
CICS Uses DB2, where DB2 fails.
Degradation of a non-functionally dependent resource. Example:
CICS Uses DB2, where DB2 degrades.

In each case, if ResourceA has a functional dependency on ResourceB, or is degraded, failed or made unavailable by ResourceB, BR uses the resource-impact-resource rule configured on the BRRD entry between ResourceA and ResourceB. In this case, the determination of impact can also be driven by the current environment characteristics by comparing property and value information cached at the BRMD entry for any resource with the trigger specified for the impact rule.

Within BR, resource state is evaluated at, for instance, two levels—at the resource instance level and at the RS level. The individual resource composed states—based on first level state composition rules—are represented in the BRMD entry for each resource. The $2^{nd}$ level state aggregation at the RS level may be established and implemented via the specification of impact pairing rules, such as those described in the syntax section below.

Syntax of Impact Rules
  For those resources whose state can effect another resource, the set of rules to represent the impact is as follows (on a BRRD entry), in one example:
    Resource (prop,value) impact Resource set-of-conditions
  Resource
    The Resource can be any defined resource instance, including, for example, those supported for servers, network, BR specific resources, such as Recovery Segments, or the 'BR Staff' Resource.
    Prop is to be one of the properties supported on the specified resource.
    Each Resource instance referenced here has an entry in the BRMD table, and foreign keys are used to enforce referential integrity
    Where impact is one of {degrades, fails, makes_unavailable, as examples}.
    Set-of-conditions are conditions under which this rule should trigger, as described below.

Examples of Specification
  The following are some examples of specifications for both a dependency flag, as well as the Impact pairing rules:
    DB2 (state, unavailable) degrades CICS
    CICS (state, degraded) makes_unavailable App-A, condition: RS.CurrentPSE=online_env
    CICS(state, degraded) degrades App-A, condition: RS.CurrentPSE=batch_env
    OperatingSystem "HostedDependency" with respect to ComputerSystem yields CS1 (state, failed) fails OS1.

Operation Effect
  Information on pairings can also be used to specify the effect executing an operation on a Resource can have to the state of a Resource. Specifically, operation effect pairings enable the provider, vendors and customers, as examples, to reflect a future state of a Resource as a result of potential execution of a Resource operation.

When a containment region for an error has been evaluated and recovery operations have been selected, the BRM analyzes operation effect pairings. Pairing information is retrieved from the BRRD and BR specific management data on Resources is retrieved from the BRMD.

Changes resulting from projected execution of Resource operations on the state of the Resource are indicated in operation effect pairings. Examples are:
    Operation "shutdown" on Resource testdb2 indicates Resource state becomes unavailable "(Res_testdb2, shutdown) sets (Res_testdb2, state=unavailable)"
    Operation "hyperswap_pprc_session" on LRG1 indicates Resource state becomes degraded "(LRG1, hyperswap_pprc_session") sets (LRG1,state=degraded)"
    Operation "hyperswap_pprc_session" on LRG1 successful completion indicates Resource state becomes available "(LRG1, hyperswap_pprc_session") sets (LRG1, state=available) when hyperswap_pprc_session_rc=successful Operations to be performed in the recovery workflow alter the state of Resources. Projecting the state change to the Resources resulting from recovery operation execution is used in support of constraint analysis to understand if recovery of one RS should be allowed to impact another RS. BR uses the operation effect rules configured on the BRRD entry for a resource. The determination of effect can also be driven by the current environment characteristics by comparing property, value information cached at the BRMD entry for any resource with the trigger specified for the operation effect rule.

Syntax of Operation Effect Rules
  For Resource operations that can effect the state of the Resource, the set of rules to represent the effect is, for example, as follows (on a BRRD entry):
    (Res,Res_op) effect (Res,Res_state) set-of-conditions
    (Res,op) and (RS,Res_state)
    The Resource (Res) is to have a BRMD entry for BR specific management data.
    Res_op is to be a valid operation on the specified Resource instance.
    Res_state is to be one of the valid Resource states.
    Where effect is {sets}
    Where set-of-conditions are conditions under which this rule should trigger, as described below.

Co-Location Assessment
  There is information about resource pairings that is employed for determining when a given resource is required to co-locate or required to not co-locate with another resource. The ordering information is used primarily when an operation that requires the move of a resource to a different hosting container is chosen as the recovery operation. When such an operation is chosen, the co-location pairings for that resource are evaluated in choosing a target for the move. There are two basic options for co-location: attracts and repels.

These types of rules about co-location are expected to employ a conditional expression of when they should be exercised. BR uses the runtime state of the environment to assess whether a co-location requirement is to be enforced. One simple example is: a co-location requirement may exist between two resources, but only when the state of one resource is operational.

Syntax of Ordering Rules
  For those resources that are part of a co-location pairing, the set of rules to represent the co-location is, for example, as follows (on a BRRD entry):
    resource. co-location-directive resource set-of-conditions
  resource
    Each resource instance referenced here is to have an entry in the BRMD table, or the RGTAB with use of foreign keys for referential integrity.
    The resources in a co-location pairing are restricted, in one example, to be as follows, for attracts:
    CICS< >CICS
    DB2< >DB2
    CICS< >DB2
    OperatingSystem< >ComputerSystem, or RG of ComputerSystem
    CICS< >Operating System, or RG of Operating System
    DB2< >Operating System, or RG of OperatingSystem
    OperatingSystem< >OperatingSystem
      Operating system to operating system attraction implies hosting of the two or more operating system images on the same CEC (Central Electronic Complex) in different virtual computer system containers.

The resources in a co-location pairing are restricted, for example, to be as follows, for repels:
CICS< >CICS
DB2< >DB2
CICS< >DB2
OperatingSystem< >OperatingSystem or RG of Operating System
Operating system to operating system repels implies none of the two or more operating system images are hosted on the same CEC.

The co-location-directive
Is the co-hosting indication
Supported directives: attracts, repels
Examples:
cics_r1 repels cics_r5t cics_r1 attracts db2_s1
Set-of-conditions
Is the set of expressions of when this pairing is to be evaluated for validity.

Prep Effect

There is information about resource pairings that are used in determining the effect a preparatory operation can have on a recovery operation. These linkages are used to determine which prep operation to choose during prep workflow formulation. The pairings are not required, in this example, but are configurable by customers. In addition, a set of templates is provided that customers can use, or use as a basis for modifying the result of template application.

These types of rules about the effect of a preparatory action on a recovery action, in conjunction with the measured/captured operation timings of the recovery operations, are used during prep formulation, to find the set of prep operations that will most likely achieve a desired goal, such as a required RTO.

Syntax of Ordering Rules
For those operations that are part of a prep-effect pairing, the set of rules to represent them is, for instance, as follows (on a BRRD entry):
Res.operation1 prepeffect-directive Res.operation2 set-of-conditions
Res.operation1
The Res can be any resource instance, including, for example, those supported for servers, network, BR specific resources, such as Recovery Segments, or the 'BR Staff' Resource.
Operation1 type is preparatory, and is limited to those supported on the specified resource.
Each resource instance referenced is to have an entry in the BRMD table, with use of foreign keys for referential integrity.
Res.operation2
The Resource can be any resource instance, including, for example, those supported for servers, network, BR specific resources, such as Recovery Segments, or the 'BR Staff' Resource; can be the same Resource instance as that referenced in Res.operation1.
Operation2 type is to be recovery, and is limited, in this example, to those supported on the specified resource.
Each resource instance referenced here is to have an entry in the BRMD table, with use of foreign keys for referential integrity.
The prepeffect-directive
Is the indication of effect of the prep operation on the recovery operation.
Supported directives: effect, as an example.
Examples:
ReplicationSession.initiate_fc effect LogicalReplicationGroup.Restore_from_fc.
Set-of-conditions
Is the set of expressions of when this pairing is to be evaluated for validity, as described below.

Constraint

Information on pairings can also be used to specify constraints on what recovery actions can be taken. Specifically, constraint pairings enable customers to allow or disallow recovery of one RS which represents a business application to cause another RS to become failed, degraded up to RTO allowed recovery time, degraded beyond RTO allowed recovery time, or not to be impacted.

When a Containment Region for an error has been evaluated, recovery operations have been selected and the potential effect of recovery operations to RS(s) states evaluated, the BRM analyzes constraint pairings. References to the BRRD for pairings information and the BRMD for BR specific Resource data is utilized.

Changes to one RS state are either allowed or disallowed from altering another RS state.
a) Recovery of a RS can cause another RS to become unavailable. Example:
Recovery for RS1 causes CICS to be started on an OS image that must shut down a test DB2 causing RS2 to become unavailable.
b) Recovery of a RS can be disallowed from causing another RS to become unavailable. Example:
Recovery for RS1 causes CICS to be started on a OS image that must shut down a test DB2 is disallowed because RS2 would become unavailable.
c) Recovery of a RS can be disallowed to cause another RS to become degraded. Example:
Recovery for RS1 where RS1 and RS2 use LRG1 and recovery for LRG1 is performed by a hyperswap is disallowed because the hyperswap causes LRG1 to be degraded which causes RS2 to be degraded.
d) Recovery of a RS can be allowed to cause another RS to become degraded up to it's RTO. Example:
Recovery for RS1 where RS1 and RS2 use LRG1 and recovery for LRG1 is performed by a hyperswap that has an operation execution time less than the RTO for RS2 is allowed.

In each case, if recovery is performed for RS1, the recovery operations cause an impact to RS2. RS2 becomes either unavailable or degraded as a result. BR uses the constraint rules configured on the BRRD entry between RS1 and RS2. The determination of impact can also be driven by the current environment characteristics by comparing property, value information cached at the BRMD entry for any resource with the trigger specified for the impact rule.

Syntax of Constraint Rules
For those RSs whose state can effect another RS, the set of rules to represent the impact is, for instance, as follows (on a BRRD entry):
(RS1_state,value) impact (RS2_state,value) set-of-conditions
(RSx_state, value)
The RS is to be a defined BR Recovery segment instance.
RS_state,value is to be one of the valid values for RS state
Each RS instance referenced here is to have an entry in the BRMD table Where impact is one of {can, cannot}, as examples.
Where set-of-conditions are conditions under which this rule should trigger, as described below.

Set of Conditions and Validation

When specifying pairings, customers may also specify conditions which are to be evaluated as true during runtime for the pairing to be used. The UI is used to compose a pairing and associated triggers or set-of-conditions. Multiple conditions from the list below may be specified with comparisons utilizing logical operators (e.g., equal, greater than, less than, etc.).

Supported conditions:
- RS Admin State of any RS containing the relationship, but need to specify which RS and which admin state.
- RS Operational State (based on state aggregation), same conditions as above with respect to relationships that fall into multiple RS.
- Composed state of either Resource involved in the relationship.
- RS.CurrentPSE.
- Property value settings in the BRMD entry of the Resource(s) that participate in the pairing.
- Redundancy group state of any RG that involves either Resource of the relationship.
- Any RG that is related to any of the RS that reference this pairing information.
- Nonblocking states for Resource(s) (found in the BRMD entry for the resource).

Validation of rules with respect to triggers
- Check for conflicts amongst rules of same category.
- Examples of specific checks:
  - Same property with >1 value specified with =
  - Same property with >1 value specified in gt/lt inconsistently.
  - If both > and <specified, ensure the ranges intersect.

Persistence of Pairings and Triggers

As one example, the BRRD is implemented as a DB2 table in the Business Resilience datastore that physically resides in the BR environment. That database is created at installation time, and the BRRD table is created and initialized (if necessary) at that time. It is not associated with a particular resource and is not used to persist any resource properties. The typical access mechanism is via JDBC calls from the BR UI client(s) and the BR management functions using JDBC type 4 drivers. One example of the physical model of the BRRD table is shown below and is described in detail in the following sections.

| BRRD |
|---|
| BRRD_ID: INTEGER |
| CR_ID: INTEGER [FK] |
| RELATIONSHIP_ID: CHAR(32) |
| RESOURCE1_ID: INTEGER |
| RESOURCE2_ID: INTEGER |
| PAIRING_TYPE: INTEGER |
| RESOURCE1_OPERATION_ID: INTEGER |
| RESOURCE1_PROPERTY_ID: INTEGER |
| RESOURCE1_VALUE: VARCHAR(32) |
| RESOURCE1_CATEGORY_ID: INTEGER |
| DIRECTIVE: INTEGER |
| RESOURCE2_OPERATION_ID: INTEGER |
| RESOURCE2_PROPERTY_ID: INTEGER |
| RESOURCE2_VALUE: VARCHAR(32) |
| RESOURCE2_CATEGORY_ID: INTEGER |
| TRIGGER: VARCHAR(256) |
| DEPLOYMENT_INFO_ID: INTEGER |
| TS_UPDATE: TIMESTAMP |

The BRRD table includes the singleton values associated with a BRRD entry. One example of the fields of the BRRD table are described below.

| Data Field | Data Type | Description | Keys | Index |
|---|---|---|---|---|
| BRRD_ID | Integer | Generated integer key for uniqueness via a DB2 sequence. Note all primary keys in the BR database will be a generated integer for compatibility with other non-DB2 databases. | Primary | |
| CR_ID | Integer | Foreign key from the CR table that can be used to find all the pairing entries used for a particular containment region | Foreign | |
| RELATIONSHIP_ID | Char(32) | ResourceID of the relationship resource (if part of resource to resource relationship) | | |
| DEPLOYMENT_INFO_ID | Integer | Key into the deployment information table for hosting OS and WAS for this relationship (if part of resource to resource relationship) | | |
| RESOURCE1_ID | Integer | Key into the BRMD table | | Yes |
| RESOURCE2_ID | Integer | Key into the BRMD table | | Yes |
| PAIRING_TYPE | Integer | An index into the array of possible pairing | | Yes |

-continued

| Data Field | Data Type | Description | Keys | Index |
|---|---|---|---|---|
| | | types. For example:<br>1. Operation ordering<br>2. Impact assessment<br>3. Operation effect<br>4. Constraint analysis<br>5. Co-location assessment<br>6. Prep effect<br>7. Etc. | | |
| RESOURCE1_OPERATION_ID | Integer | Key into the BRMD Operation table | | Yes |
| RESOURCE1_PROPERTY_ID | Integer | Key into the BRMD Property table | | |
| RESOURCE1_VALUE | Varchar(32) | Optional value for the pairing directive | | |
| RESOURCE1_CATEGORY_ID | Integer | Pointer to the category type | | |
| DIRECTIVE | Integer | An index into the array of possible pairing directives. For example:<br>1. Degrades<br>2. Start<br>3. Fail<br>4. Stop<br>5. Etc. | | |
| RESOURCE2_OPERATION_ID | Integer | Key into the BRMD Operation table | | Yes |
| RESOURCE2_PROPERTY_ID | Integer | Key into the BRMD Property table | | |
| RESOURCE2_VALUE | Varchar(32) | Optional value for the pairing directive | | |
| RESOURCE2_CATEGORY_ID | Integer | Pointer to the category type | | |
| TRIGGER | Varchar(256) | Trigger rule for the pairing | | |
| DEPLOYMENT_INFO_ID | Integer | Key into the deployment information table for hosting OS and WAS for this relationship (if part of resource to resource relationship) | | |
| TS_UPDATE | Timestamp | Timestamp of initial create or last update and defaults to current timestamp | | |

Add/Update for Pairings

Pairing information can be added or updated. One embodiment of the logic to add or revise pairing information is described with reference to FIGS. 9A-9L. In one example, this logic is invoked via the BR Administrator interfaces to create or change pairing information related to resources, such as rules for operation ordering, impact assessment, operation effect, constraint analysis, prep effect, and co-location, and is supported by cooperative processing between the UI and BRM components. The syntax of the pairing is checked and the trigger conditions that can apply to the pairing are processed together to verify if there are inconsistencies. Any updates which are not consistent are communicated to the BR administrator via the UI.

Updating the pairing rules has an impact on the currently validated and prepared policies, since these rules are used in generating a prepare workflow, in estimating recovery time, and in formulating recovery, as examples. As a result, the RS Summary State is updated for the set of RS that include the pairing in their scope of management. RS Summary State is not set for other RSs. The admin initiates this request. Upon successful completion, the BRRD Entry is updated, as well as the RS Summary State for those RSs that include the pairing in their management scope.

Figure 9A:
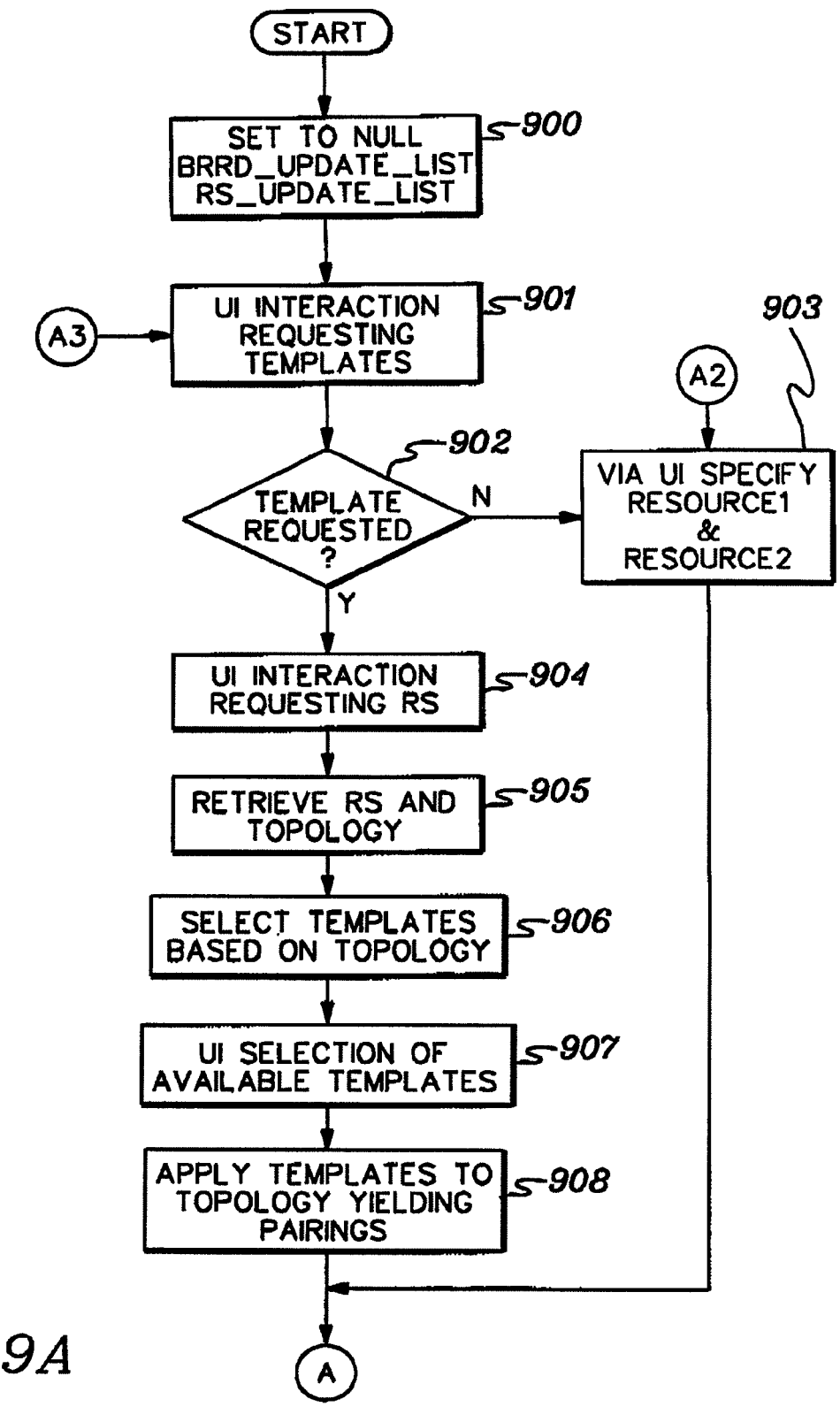
FIGS. 9A-9M depict one embodiment of the logic to create or update a pairing construct, in accordance with an aspect of the present invention.

Referring initially to FIG. 9A, processing for creation or update of a pairing is initiated through the BR administrator UI. Lists used to accumulate updates to pairings and associated RS(s), including a BRRD_update_list and RS_update_list, are set to null, STEP 900. As pairings are created or modified, the pairing and associated RS(s) which may have workflows formed as a result of those pairings are recorded for later update. When all related pairings have been created or modified, the list of updates is used within a single transaction for modification of the set of pairings and invalidate any workflows having bindings to previously defined pairings.

A UI interaction requests the BR administrator to choose to use or not use templates for pairings, STEP 901. If templates are not requested, INQUIRY 902, the BR administrator is requested to identify the two resources that are for the pairing, STEP 903. However, if templates are to be used, the BR administrator is requested to specify the RS for which pairing information is to be processed, STEP 904. The requested RS and associated topology are retrieved, STEP 905, and templates which are applicable to the topology are selected, STEP 906. Through the UI, the available templates are presented for selection by the BR administrator, STEP 907. The requested templates are applied to the RS and associated topology to generate suggested pairings, STEP 908.

Figure 9B:
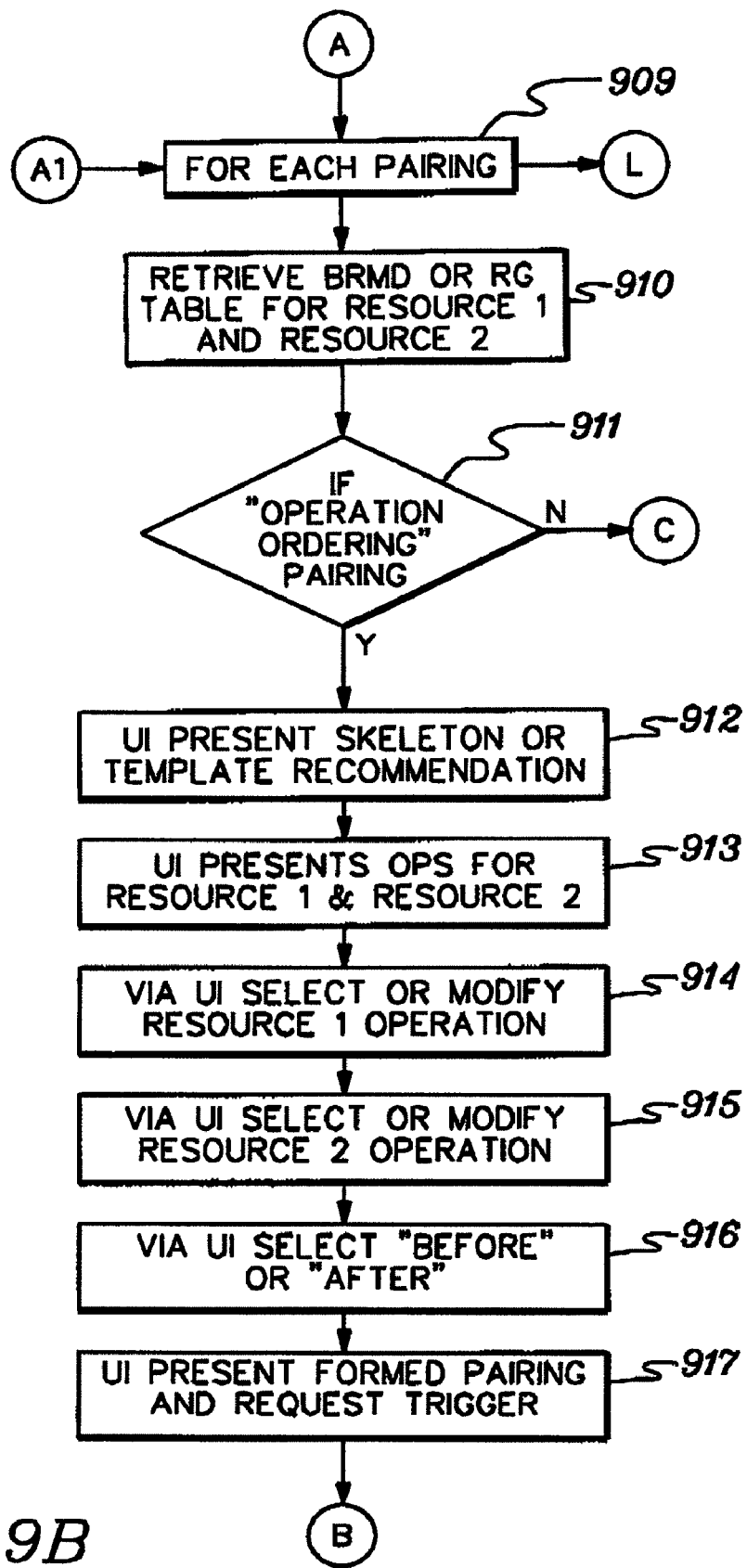

Processing proceeds for each pairing whether recommended by template evaluation or direct specification by the BR administrator, STEP 909 (FIG. 9B). Each pairing is evaluated by first retrieving the BRMD or RG table entry for Resource 1 and Resource 2, STEP 910.

If an "operation ordering" pairing is being processed, INQUIRY 911, either the pairing recommended by the template is presented or a skeleton for the operation ordering is augmented with the specified Resource 1 and Resource 2, and the pairing is presented, STEP 912. Through the UI, operations for Resource 1 and Resource 2 are presented, STEP 913. A selection or modification for changing a recommended template or existing pairing of Resource 1 operation from among the presented list of valid Resource 1 operations is made, STEP 914. A selection or modification for changing a recommended template or existing pairing of Resource 2 operation from among the presented list of valid Resource 2 operations is made, STEP 915. The operation ordering directive is selected from the UI presented valid values of "before" or "after", STEP 916. The formed pairing is presented with a question to the BR administrator regarding trigger specification, STEP 917.

If trigger or set-of-condition specifications are desired, INQUIRY 918 (FIG. 9C), the Add/Update Trigger, "AddupT", routine, described below, is invoked, STEP 919. Thereafter, or if trigger specification is not requested, definition of the operation ordering pairing concludes with adding RS(s) associated with either of the two resources participating in the pairing to the list of RS(s) requiring summary status update, STEP 920. Processing then continues with STEP 974 (FIG. 9L), as described below.

Figures 9C, 9D:
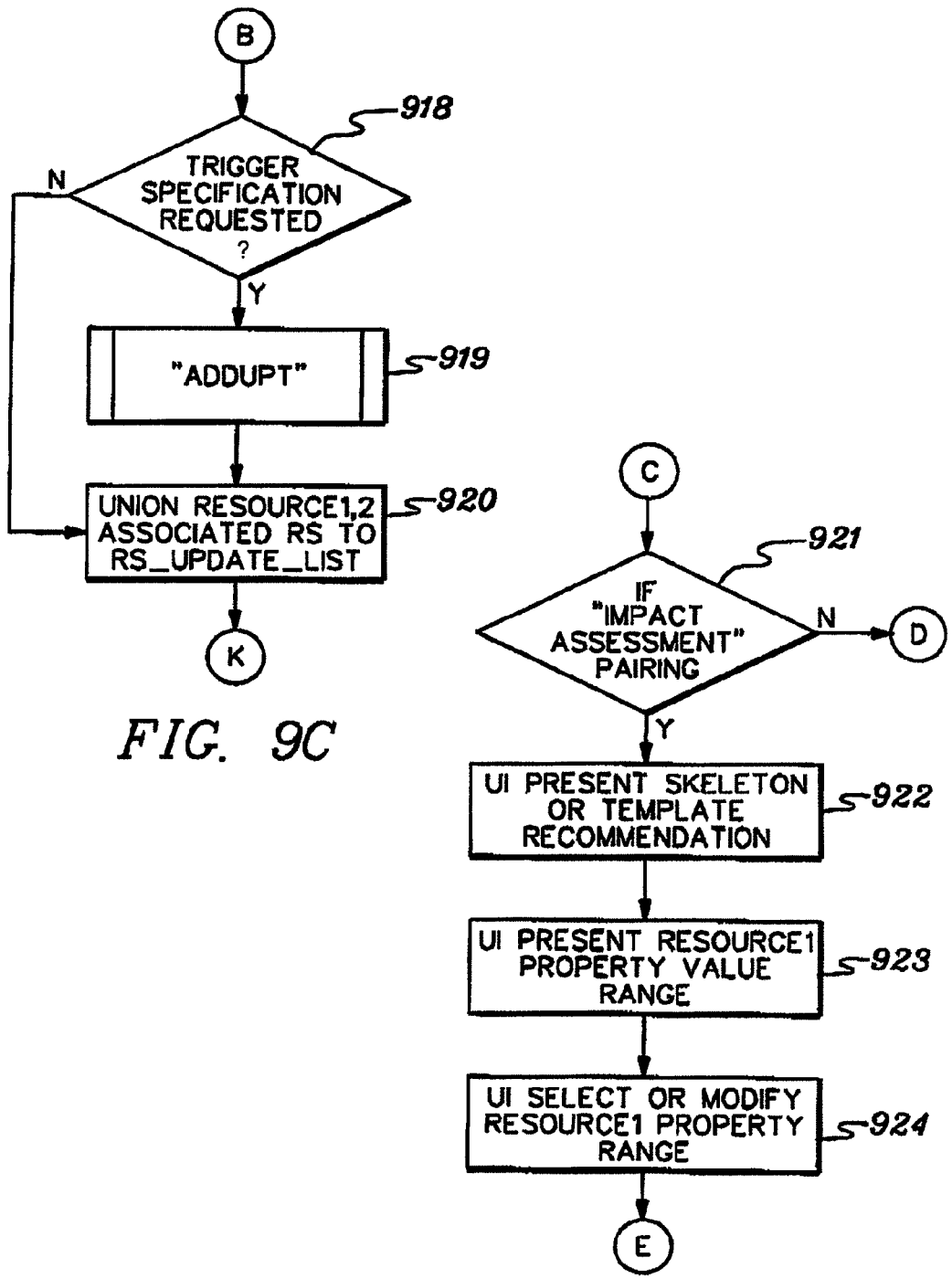
Figure 9E:
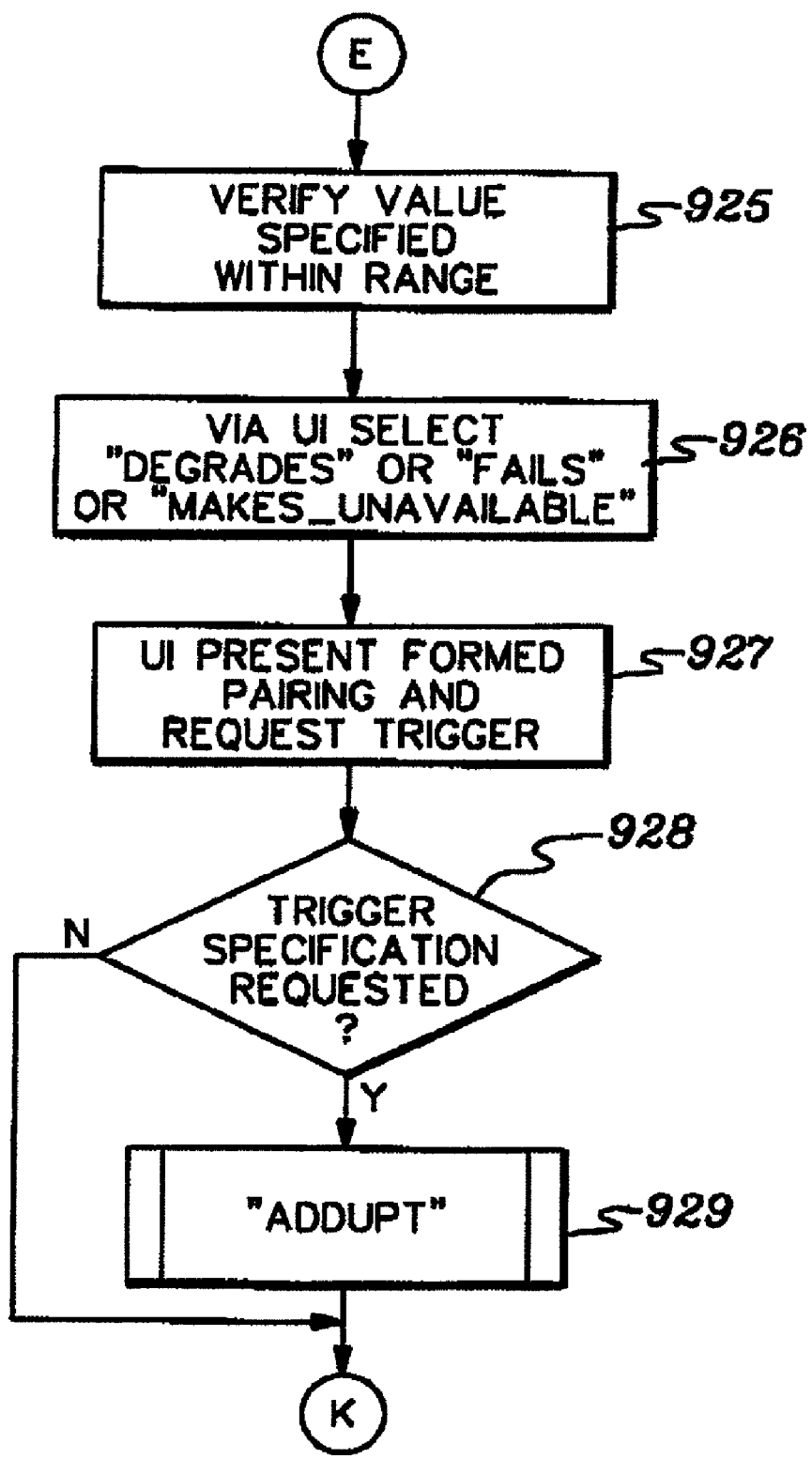

Returning to INQUIRY 911 (FIG. 9B), if an operation ordering is not being processed, a determination is made as to whether an impact assessment pairing is being processed, INQUIRY 921 (FIG. 9D). If an "impact assessment" pairing is being processed, either the pairing recommended by the template is presented or the skeleton for impact assessment is augmented with the specified Resource 1 and Resource 2, and the pairing is presented, STEP 922. Through the UI, Resource 1 property and value range specifications are presented, STEP 923. A selection or modification for changing a recommended template or existing pairing of Resource 1 property and associated value from among the presented list of valid Resource 1 properties is made, STEP 924. The value specified for the resource 1 property is validated to be within range, STEP 925 (FIG. 9E). The impact assessment directive is selected from the UI presented valid values of "degrades", "fails" or "makes_unavailable", STEP 926. The formed pairing is presented with a question to the BR administrator regarding trigger specification, STEP 927.

If trigger or set-of-condition specifications is desired, the Add/Update Trigger, "AddupT", routine is invoked, STEP 929. Thereafter, or if trigger or set-of-condition specifications is not desired, processing continues with STEP 974 (FIG. 9L), as described below.

Figure 9F:
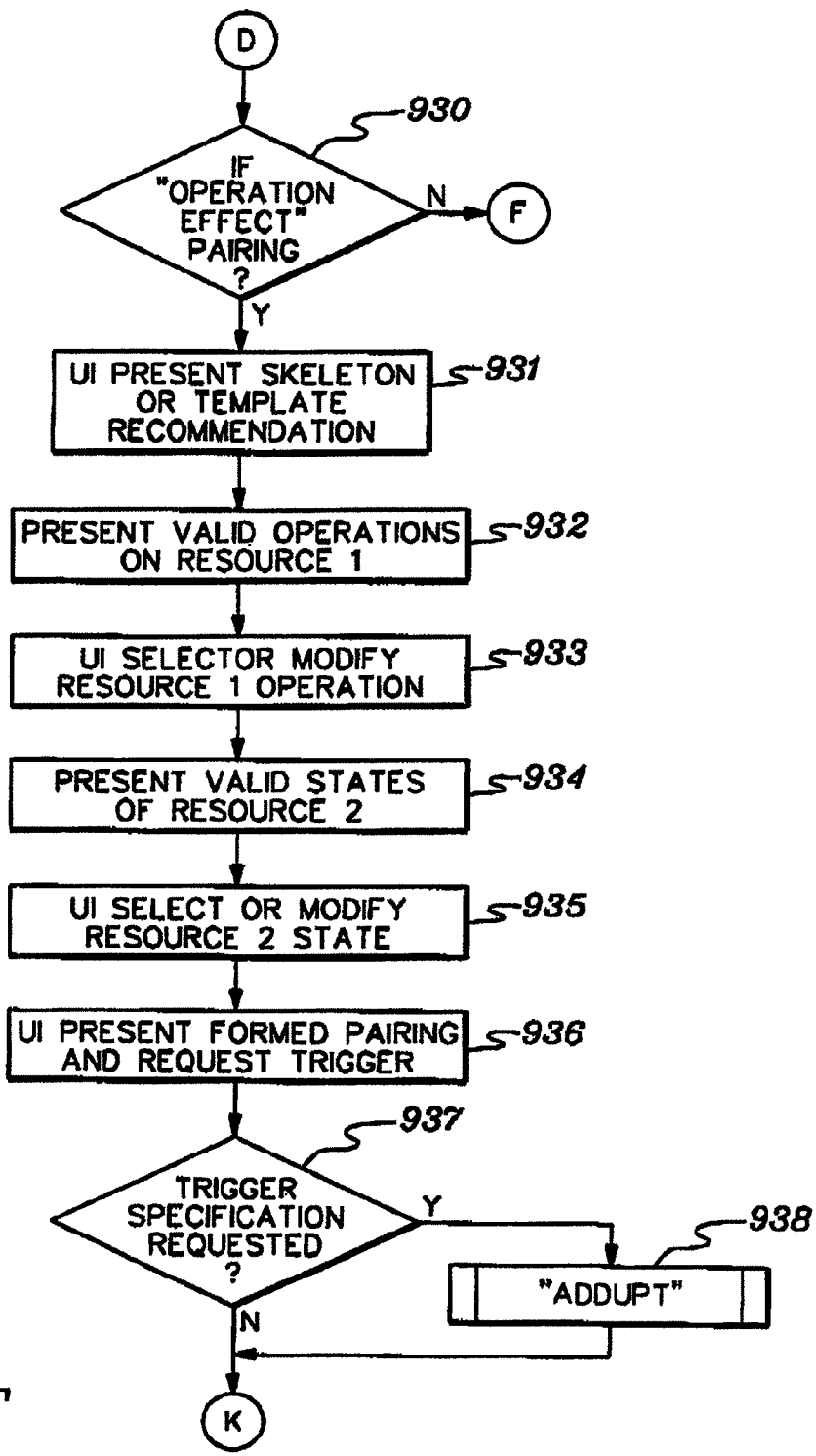

Returning to INQUIRY 921, if impact assessment pairing is not being processed, a determination is made as to whether "operation effect" pairing is being processed, INQUIRY 930 (FIG. 9F).

If an "operation effect" pairing is being processed, either the pairing recommended by the template is presented or the skeleton for the operation effect is augmented with the specified Resource 1 and Resource 2, and the pairing is presented, STEP 931. Through the UI, valid operations for Resource 1 are presented, STEP 932. A selection or modification for changing a recommended template or existing pairing of Resource 1 operation from among the presented list of valid Resource 1 operations is made, STEP 933. Through the UI, valid state(s) for Resource 2 are presented, STEP 934. A selection or modification for changing a recommended template or existing pairing of Resource 2 state from among the presented list of valid Resource 2 state(s) is made, STEP 935. The formed pairing is presented with a question to the BR administrator regarding trigger specification, STEP 936.

If trigger or set-of-condition specifications is desired, INQUIRY 937, the Add/Update Trigger, "AddupT", routine is invoked, STEP 938. Thereafter, or if the trigger or set of condition specifications is not desired, processing continues with STEP 974 (FIG. 9L), as described below.

Figure 9G:
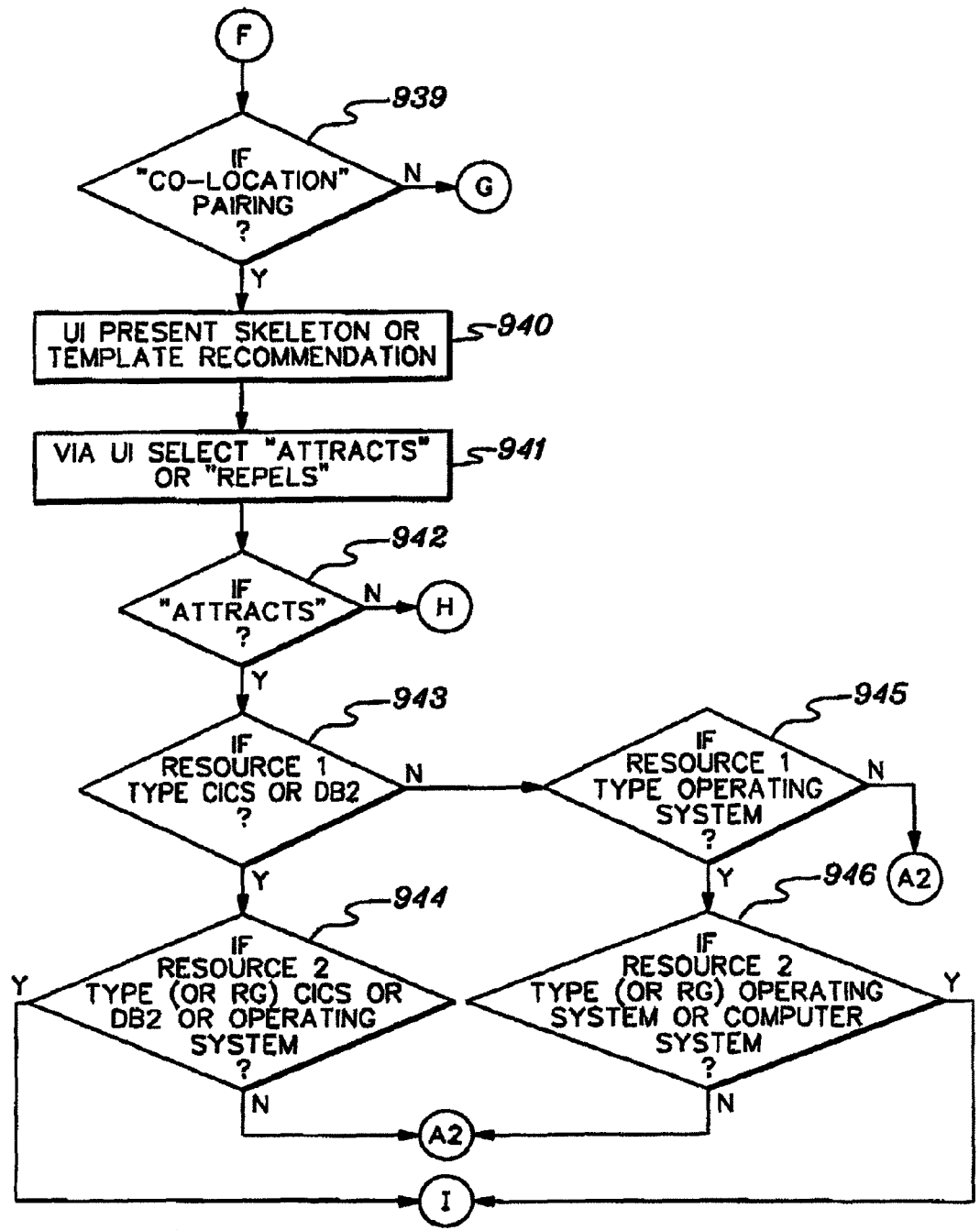

Returning to INQUIRY 930, if operation effect pairing is not being processed, a determination is made as to whether co-location pairing is being processed, INQUIRY 939 (FIG. 9G).

If a "co-location" pairing is being processed, either the pairing recommended by the template is presented or the skeleton for the co-location pairing is augmented with the specified Resource 1 and Resource 2, and the pairing is presented, STEP 940. The co-location directive is selected from the UI presented valid values of "attracts" or "repels", STEP 941. If "attracts" is selected, INQUIRY 942, Resource 1 is evaluated for being of type CICS or DB2, INQUIRY 943. If true, Resource 2 type is evaluated for being either CICS, DB2, operating system or a RG of CICS, DB2 or operating system type, INQUIRY 944, and processing continues, as described below.

Returning to INQUIRY 943, if Resource 1 is not of type CICS or DB2, a determination is made as to whether Resource 1 is of type operating system, INQUIRY 945. If Resource 1 is of type operating system, INQUIRY 945, Resource 2 is evaluated for being of type operating system, computer system or RG of operating system or computer system type, INQUIRY 946. If Resource 1 and Resource 2 fail to pass validity checks, INQUIRIES 943-946, processing returns to selection of two resources for pairing specification, STEP 903 (FIG. 9A). Otherwise, processing continues with presentation of the formed pairing, STEP 951 (FIG. 9H), and request for specification of triggers, INQUIRY 952, as described below.

Figure 9H:
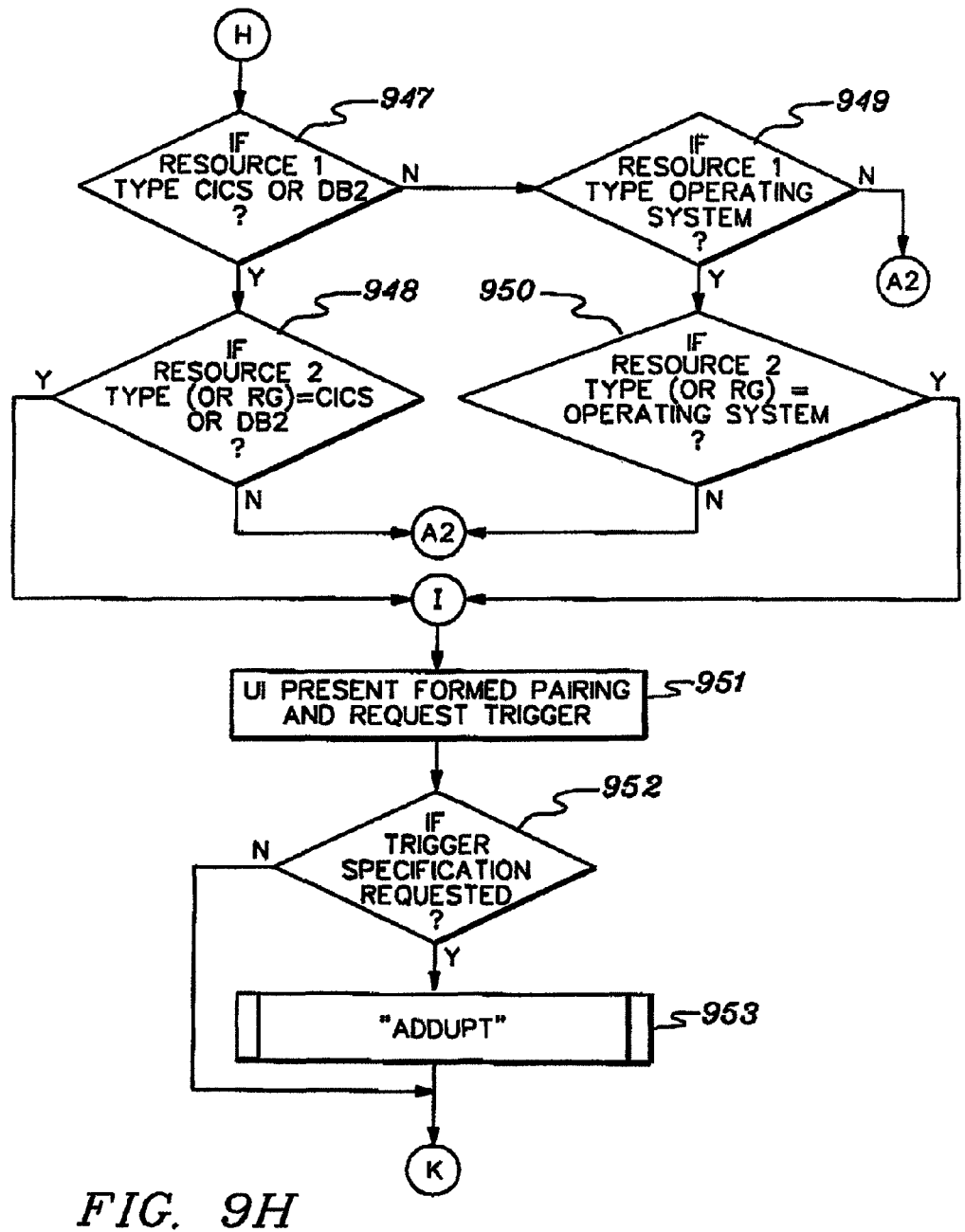

Returning to INQUIRY 942 (FIG. 9G), if "repels" is specified, Resource 1 is evaluated for being of type CICS or DB2, INQUIRY 947 (FIG. 9H). If true, Resource 2 is evaluated for being of type CICS or DB2 or RG of CICS or DB2 type, INQUIRY 948, and processing continues as described below.

Returning to INQUIRY 947, if Resource 1 is not of type DB2 or CICS, a determination is made as to whether Resource 1 is of type operating system, INQUIRY 949. If Resource 1 is of type operating system, Resource 2 is evaluated for being of type operating system or RG of operating system type, INQUIRY 950. If Resource 1 and Resource 2 fail to pass validity checks, INQUIRIES 947-950, processing returns to selection of two resources for pairing specification, STEP 903 (FIG. 9A). Otherwise, processing continues with presentation of the formed pairing, STEP 951, and request for specification of triggers, INQUIRY 952.

If trigger or set-of-condition specifications are desired, INQUIRY 952, the Add/Update Trigger, "AddupT", routine is invoked, STEP 953. Thereafter, or if trigger specification is not requested, processing continues with STEP 974 (FIG. 9L), as described below.

Figure 9I:
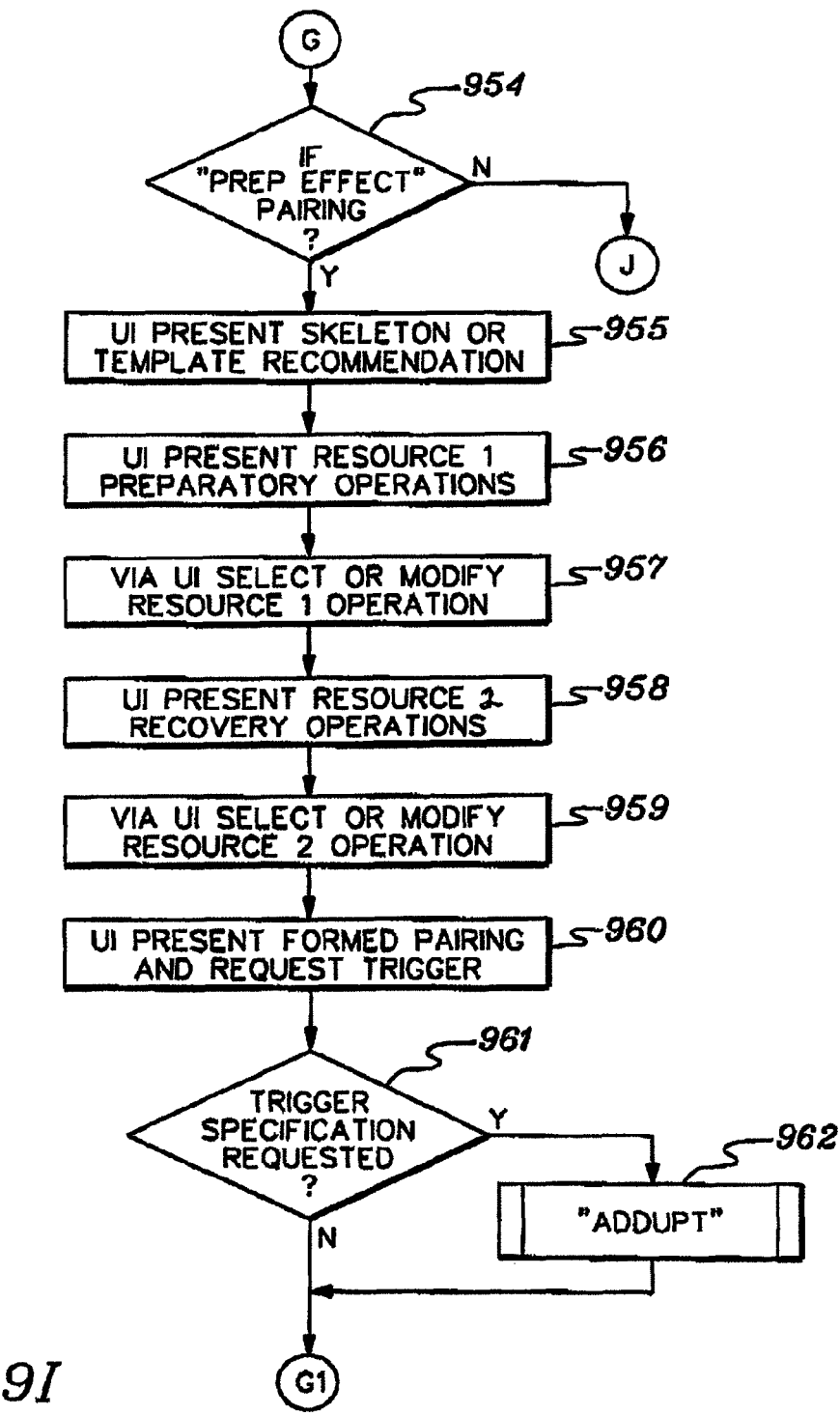

Returning to INQUIRY 939 (FIG. 9G), if co-location pairing is not being processed, a determination is made as to whether prep effect pairing is being processed, INQUIRY 954 (FIG. 9I). If a prep effect pairing is being processed, either the pairing recommended by the template is presented or the skeleton for the prep effect pairing is augmented with the specified Resource 1 and Resource 2, and the pairing is presented, STEP 955. Through the UI, valid preparatory operations for Resource 1 are presented, STEP 956. A selection or modification for changing a recommended template or existing pairing of Resource 1 preparatory operation from among the presented list of valid Resource 1 preparatory operations is made, STEP 957. Through the UI, valid recovery operations for Resource 2 are presented, STEP 958. A selection or modification for changing a recommended template or existing pairing of Resource 2 recovery operation from among the presented list of valid Resource 2 recovery operations is made, STEP 959. The formed pairing is presented with a question to the BR administrator regarding trigger specification, STEP 960.

Figure 9J:
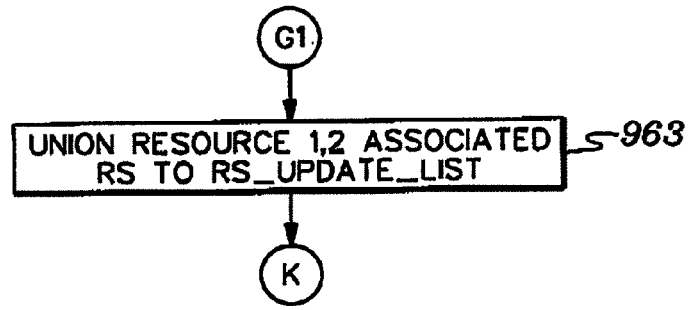

If trigger or set-of-condition specifications is desired, INQUIRY 961, the Add/Update Trigger, "AddupT", routine is invoked, STEP 962. Thereafter, or if trigger specification is not requested, definition of the prep effect pairing continues with adding RS(s) associated with either of the two resources participating in the pairing to the list of RS(s) requiring summary status update, STEP 963 (FIG. 9J). Thereafter, processing continues with STEP 974 (FIG. 9L), as described below.

Figure 9K:
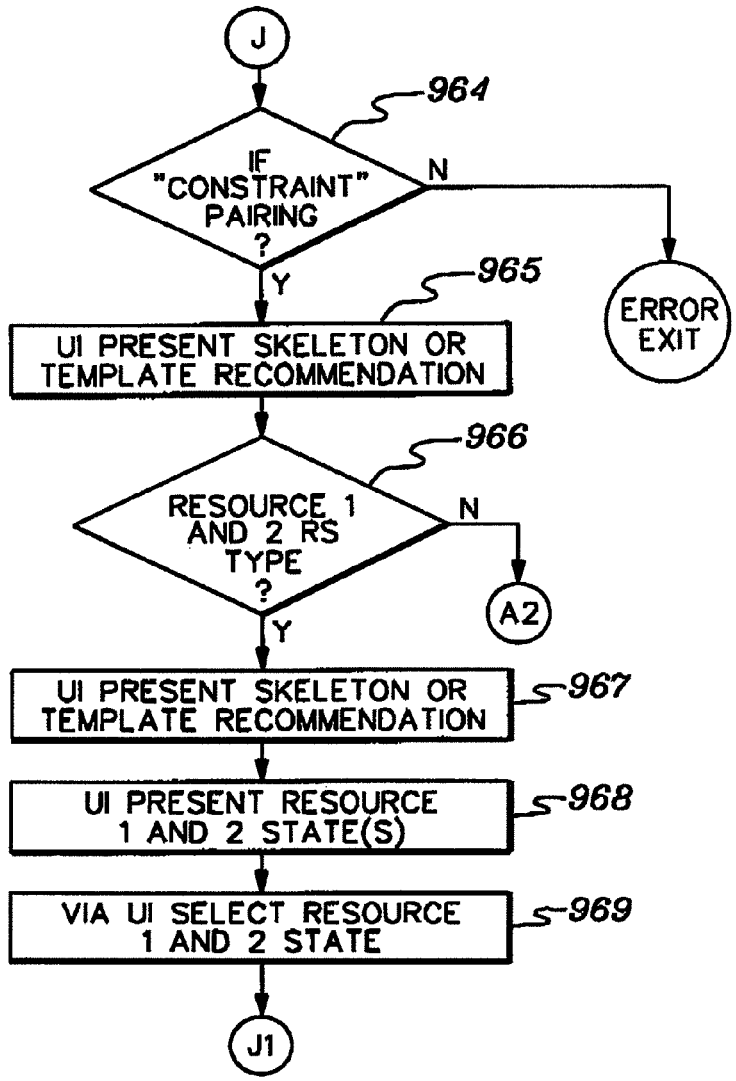

Returning to INQUIRY 954, if prep-effect pairing is not being processed, a determination is made as to whether constraint pairing is being processed, INQUIRY 964 (FIG. 9K). If constraint pairing is not being processed, then a non-recognized pairing type has been found, an error is presented and processing terminates.

Figures 9L, 9M:
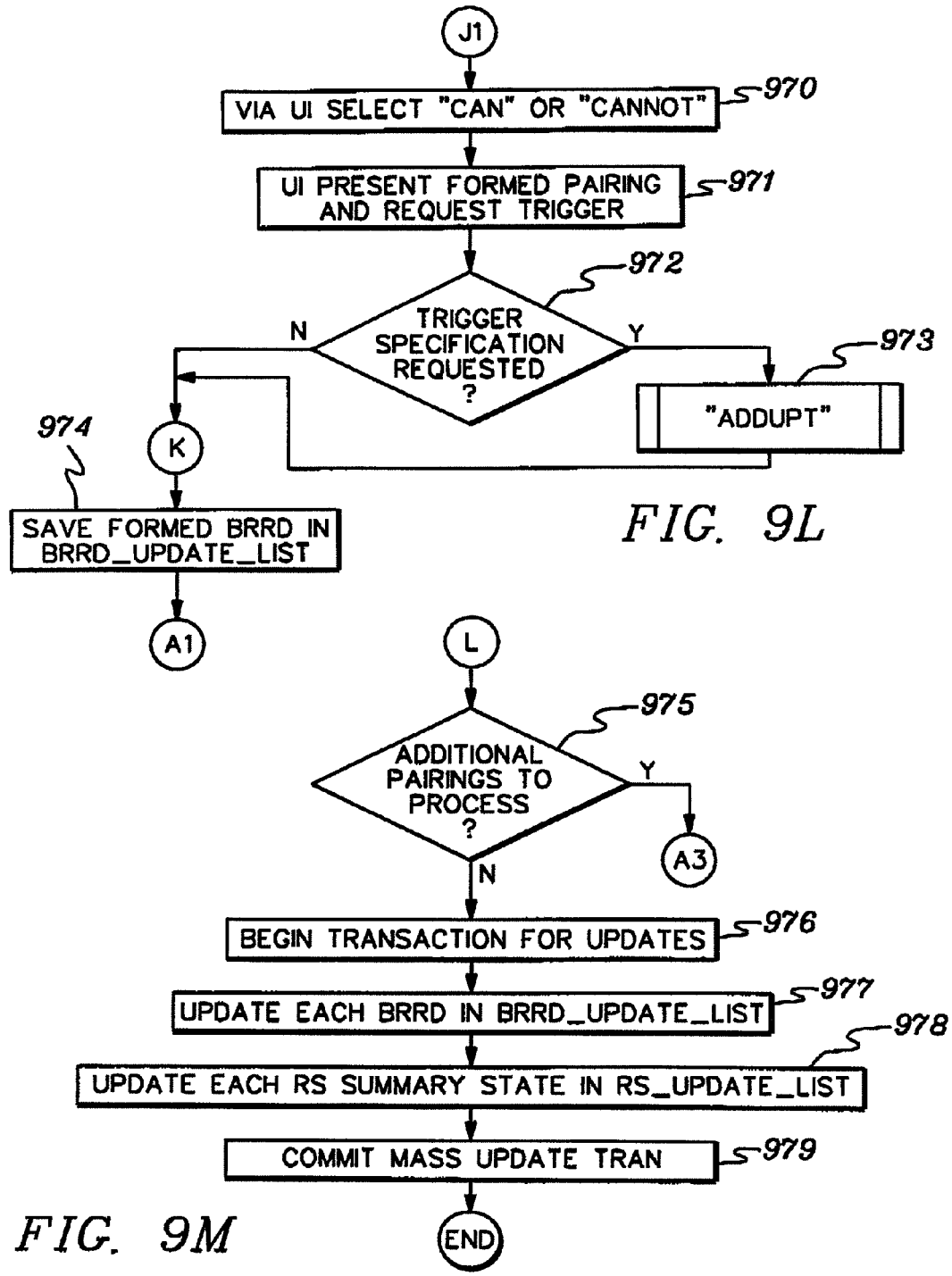

Otherwise, if a constraint pairing is being processed, either the pairing recommended by the template is presented or the skeleton for the constraint pairing is augmented with the specified Resource 1 and Resource 2, and the pairing is presented, STEP 965. A determination is made as to whether Resource 1 and Resource 2 are RS type, INQUIRY 966. If not, processing continues at STEP 903 (FIG. 9A). Otherwise, either the pairing recommended by the template is presented or the skeleton for the constraint pairing is augmented with specified Resource 1 and Resource 2, and the pairing is presented, STEP 967. Through the UI, state(s) for Resource 1 and Resource 2 are presented, STEP 968. A selection or modification for changing a recommended template or existing pairing of Resource 1 state and Resource 2 state from among the presented list of valid Resource 1 and Resource 2 states is made, STEP 969. The constraints directive is selected from the UI presented valid values of "can" or "cannot", STEP 970 (FIG. 9L). The formed pairing is presented with a question to the BR administrator regarding trigger specification, STEP 971.

If trigger or set-of-condition specifications is desired, INQUIRY 972, the Add/Update Trigger, "AddupT", routine is invoked. STEP 973. Thereafter, or if trigger specification is not requested, processing continues with saving pairings that have been formed in the BRRD_update_list for subsequent update, STEP 974, as, for example, an atomic transaction. Processing then returns to STEP 909 (FIG. 9B).

When all the pairings in the selected group have been processed, a determination is made as to whether additional pairings are to be processed, INQUIRY 975 (FIG. 9M). If additional pairings are to be processed, INQUIRY 975, processing continues with the UI interaction questioning template application, STEP 901 (FIG. 9A). Otherwise, a transaction is started in order to surface, in a consistent way, the set of pairings formed, STEP 976. Each BRRD from the BRRD_update_list is recorded, STEP 977, and each RS for which previously formed workflows are to be invalidated is recorded, STEP 978. The transaction is committed to externalize the pairing changes, STEP 979, and processing completes.

Definition of Triggers

As described above, if trigger or set-of-condition specifications is desired, the AddUpt routine is invoked. One embodiment of the logic of this routine is described with reference to FIGS. 10A-10E. In one example, this logic is invoked and controlled by the UI component of the BR system, and supported by cooperative processing between the UI and BRM components.

Figure 10A:
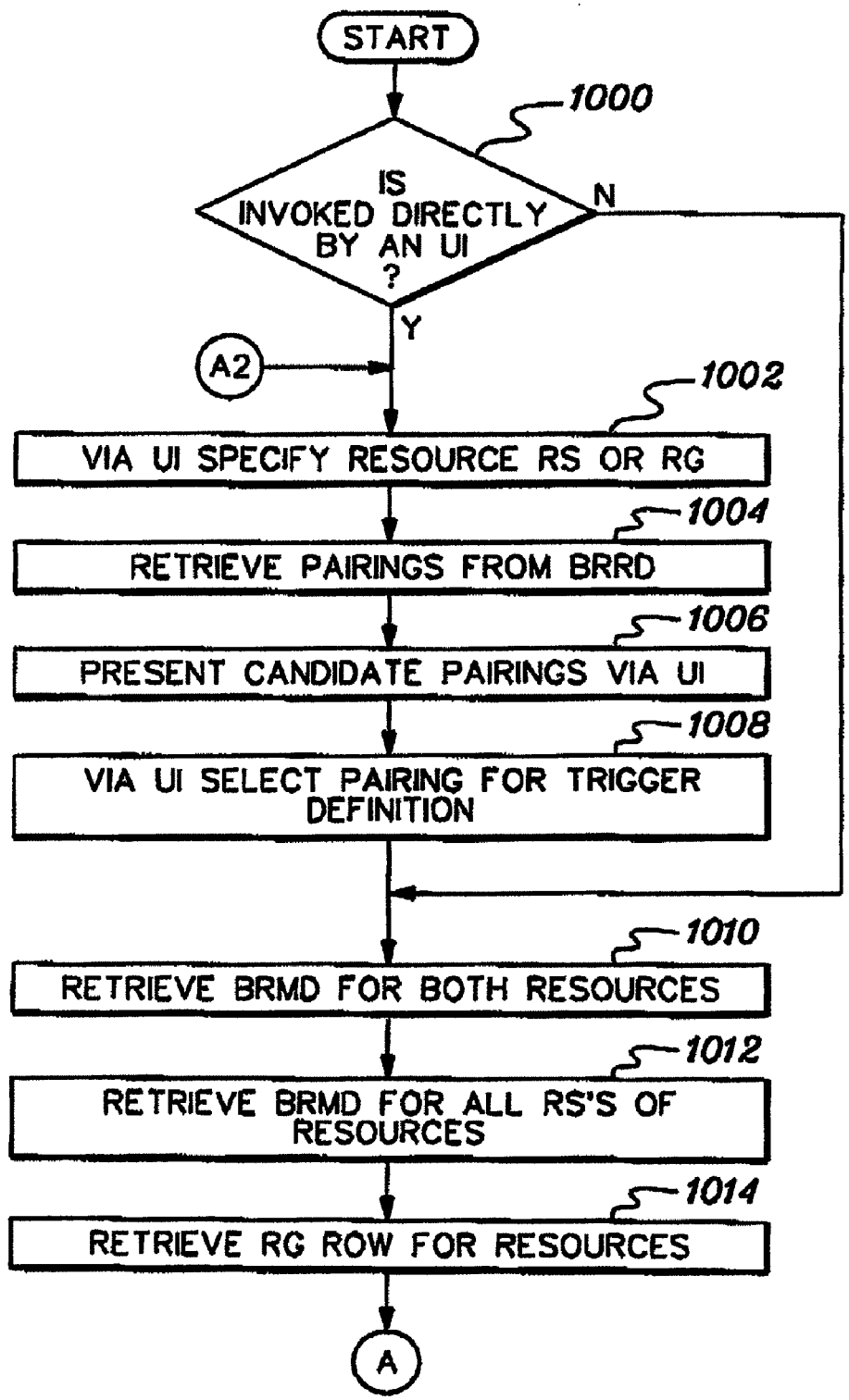
FIGS. 10A-10D depict one embodiment of the logic to define triggers, in accordance with an aspect of the present invention.

Referring to FIG. 10A, definition of triggers or set-of-conditions for pairings can be invoked directly through the BR administrator's UI or can be invoked from processing to define or modify pairings. If invoked directly from the UI, INQUIRY 1000, a request for specification of Resource, RS or RG for which pairings are to be processed is presented via the UI, STEP 1002. For the specified Resource, RS or RG, pairings are retrieved from the BRRD by using indexes for the first and second resource of pairings, STEP 1004. The candidate pairings are presented, STEP 1006, for customer selection, STEP 1008. Whether invoked directly or from pairing definition, the BRMD entries for both resources associated with the pairing being processed are retrieved, STEP 1010.

Figure 10B:
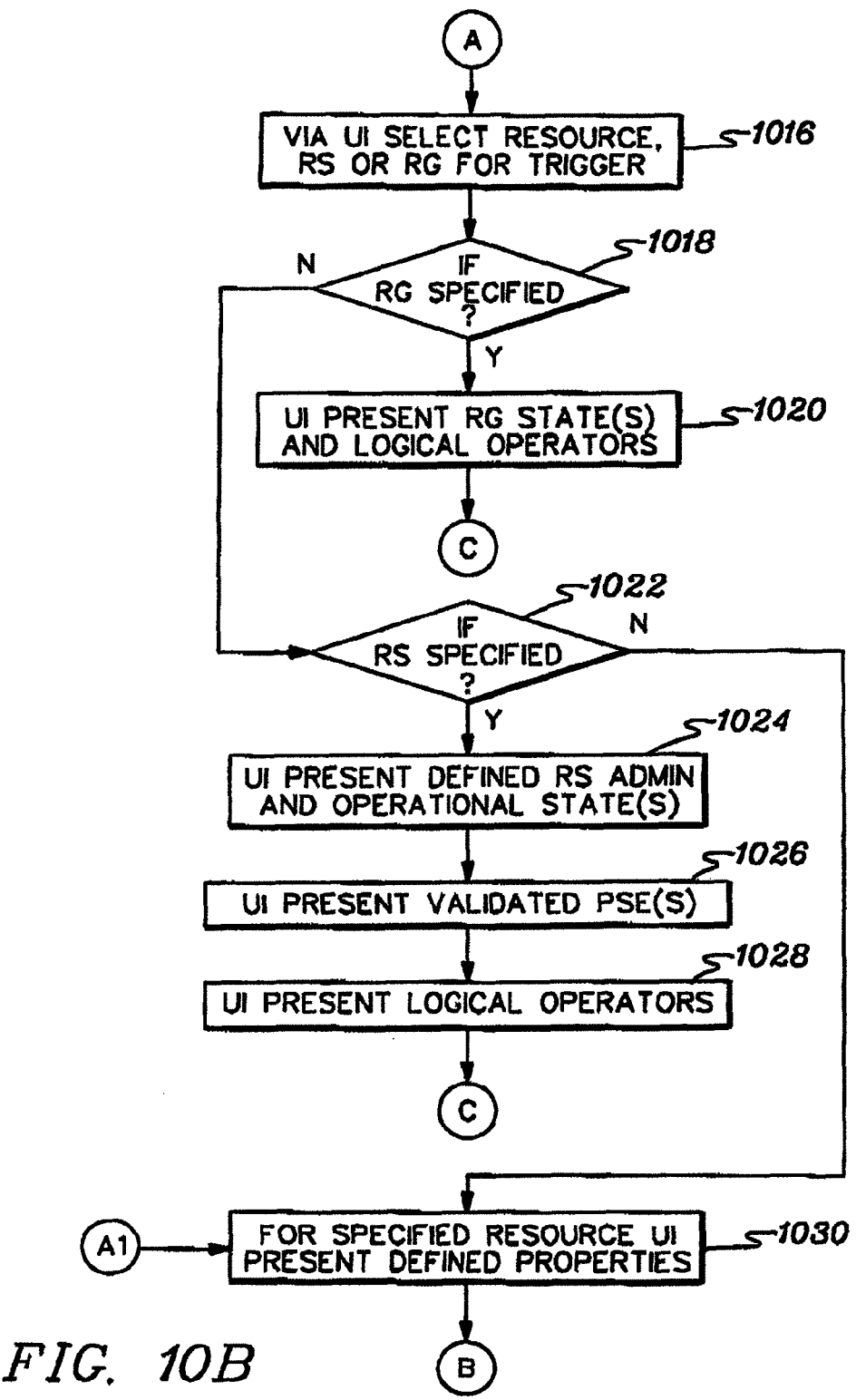

RS(s) associated with either resource of the pairing being processed are retrieved, STEP 1012, and RG(s) associated with either resource of the pairing are retrieved, STEP 1014. Both resources associated with the pairing along with RS(s) and RG(s) are presented for customer selection in formation of a trigger condition, STEP 1016 (FIG. 10B).

If the customer chooses to form a trigger condition based on an RG, INQUIRY 1018, the states associated with the RG and logical operators for equal or not equal are presented for selection, STEP 1020. Processing then continues at STEP 1036 (FIG. 10C), as described below.

Returning to INQUIRY 1018 (FIG. 10B), if an RG is not specified, but an RS is selected for the trigger condition, INQUIRY 1022, defined RS administrative and aggregated operational states are presented, STEP 1024. Further, validated PSE(s) associated with the RS are presented via the UI for selection in forming a trigger condition, STEP 1026. Logical operators of equal and not equal are also presented for selection in formation of the trigger condition, STEP 1028. Processing then continues with STEP 1036 (FIG. 10C), as described below.

Figure 10C:
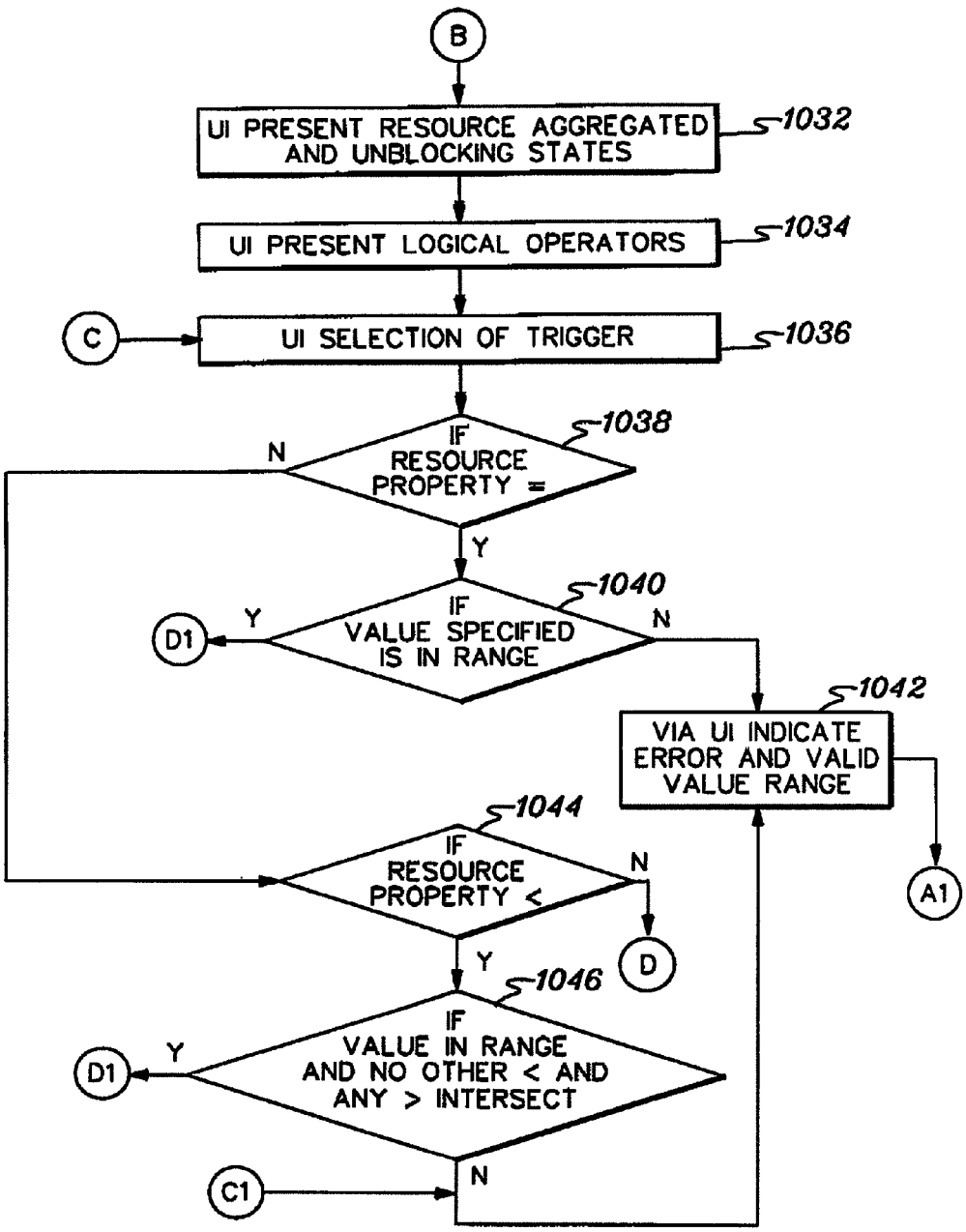

Returning to INQUIRY 1022, if an RG or RS is not specified, for a specified resource to be used in forming a trigger condition, properties and valid value ranges for properties of the resource are presented, STEP 1030. The defined aggregated and unblocking state(s) associated with the resource are presented via the UI, STEP 1032 (FIG. 10C). Moreover, a list of logical operators for resource state specification of equal and not equal and a list of logical operators for resource property specification of equal, greater than and less than are presented via the UI for customer selection, STEP 1034.

When customer selection of trigger conditions has been made, STEP 1036, validation for resource property and value specification is begun. If a resource property and an equal condition is specified, INQUIRY 1038, checking is performed to insure the specified value is within the valid range for the property, INQUIRY 1040. If the value specified is invalid, an error is provided to the customer along with the valid range for the property which may be limited by other trigger conditions, STEP 1042. Processing continues with customer interaction to select resource property and value for the new trigger condition, STEP 1030 (FIG. 10B).

Returning to INQUIRY 1038 (FIG. 10C), if a resource property and an equal condition is not specified, a determination is made as to whether a resource property and a less than condition is specified, INQUIRY 1044. If so, checking is performed to insure the specified value is within the valid range for the property, that there is no other less than condition on a trigger for the pairing and that any other trigger having a greater than condition has an intersecting range with the value specified, INQUIRY 1046. If the value is not valid for the current property and other trigger conditions, error notification is provided, STEP 1042, and processing continues with customer interaction to select resource property and value for the new trigger, STEP 1030 (FIG. 10B).

Figure 10D:
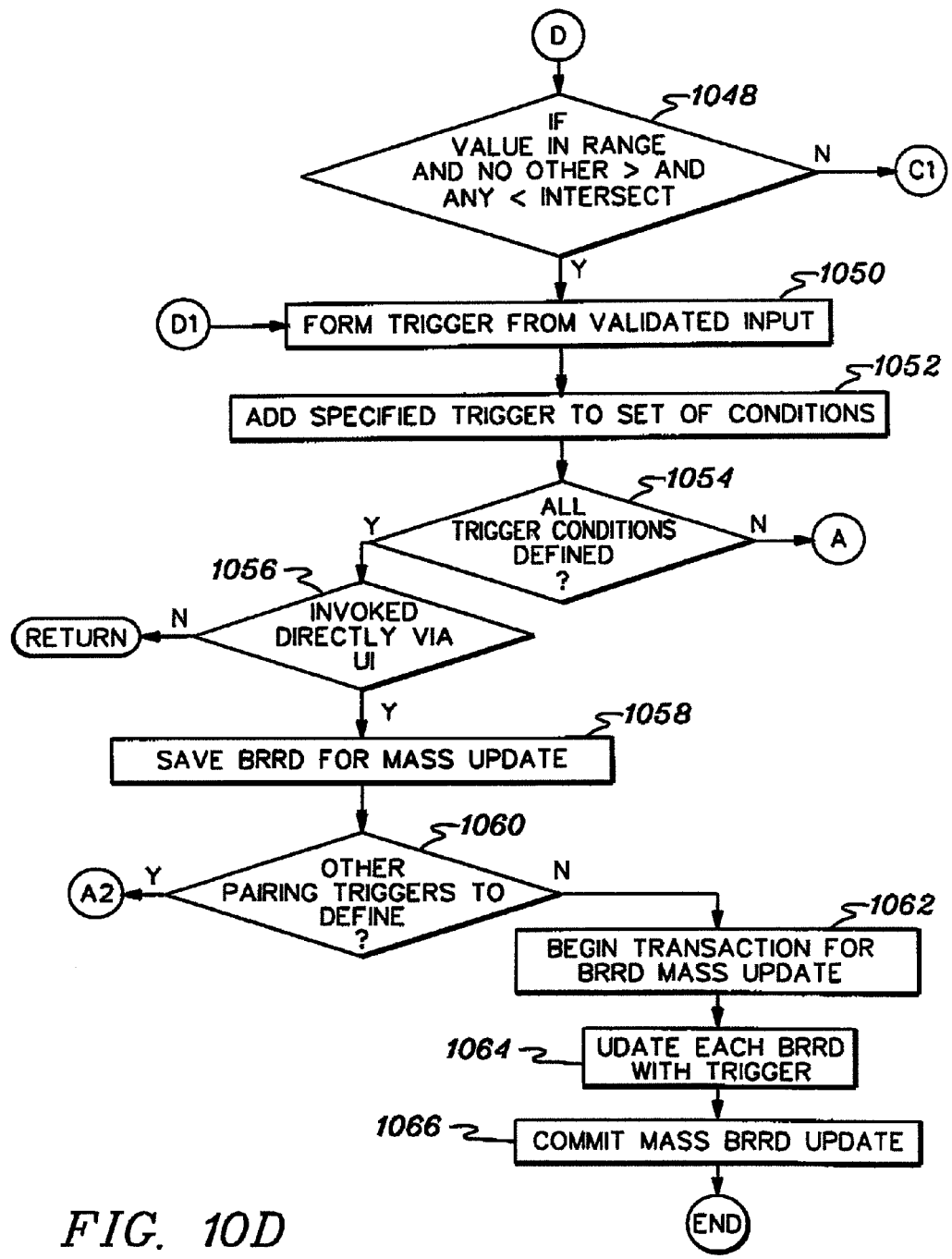

Returning to INQUIRY 1044 (FIG. 10C), if a resource property and a greater than condition is specified, checking is performed to insure the specified value is within the valid range for the property, that there is no other greater than condition on a trigger for the pairing and that any other trigger having a less than condition has an intersecting range with the value specified, INQUIRY 1048 (FIG. 10D). If the value is not valid for the current property and other trigger conditions, error notification is provided, STEP 1042 (FIG. 10C), and processing continues with customer interaction to select resource property and value for the new trigger, STEP 1030 (FIG. 10B).

After validity checking (e.g., true conditions for INQUIRIES 1040, 1044, 1046 and 1048), the new trigger is formed, STEP 1050 (FIG. 10D), and added to the set of trigger conditions for the pairing, STEP 1052. If the customer indicates through the UI that additional trigger conditions are to be specified, INQUIRY 1054, then processing continues with presentation of Resource, RS or RG selection for the next trigger condition, STEP 1016 (FIG. 10B). Otherwise, if trigger specification was invoked from pairing definition, INQUIRY 1056 (FIG. 10D), then this routine returns, and trigger specification is stored in the TRIGGER field of the associated BRRD entry.

For trigger specification requested directly through the UI, INQUIRY 1056, the updated BRRD is stored internally to this routine for subsequent mass update as, for instance, a single transaction, STEP 1058. If other pairing triggers are to be defined, INQUIRY 1060, processing continues with UI interaction to select the Resource, RS or RG for which pairings are to be located, STEP 1002 (FIG. 10A).

Otherwise, a transaction is started so all trigger updates made will appear externally to this routine in a consistent and complete manner, STEP 1062 (FIG. 10D). The BRRD entries stored internally while trigger specifications were made are recorded externally resulting in update to the TRIGGER field of BRRD entries, STEP 1064, and the transaction commits making the set of changes visible, STEP 1066.

Dynamic Evaluation of Triggers in Pairing Use

Pairings are retrieved as needed from the BRRD table via, for instance, SQL requests. BR configuration recommendations suggest backing the BRRD table with database buffer pool storage sufficient in size to insure retrieval requests are satisfied from memory access. In each process which retrieves a BRRD, evaluation is invoked to determine if the pairing is to be used based on the then current runtime environment. One embodiment of this logic is described with reference to FIGS. 11A-11E. As examples, this logic is performed by the BRM or RS depending on when in processing the pairing is used. For example, during recovery, the BRM performs the logic and uses impact, co-locate, op order, op effect and constraint pairings. As a further example, during policy validation, the RS performs the logic and uses prep effect and op order pairings.

Figure 11A:
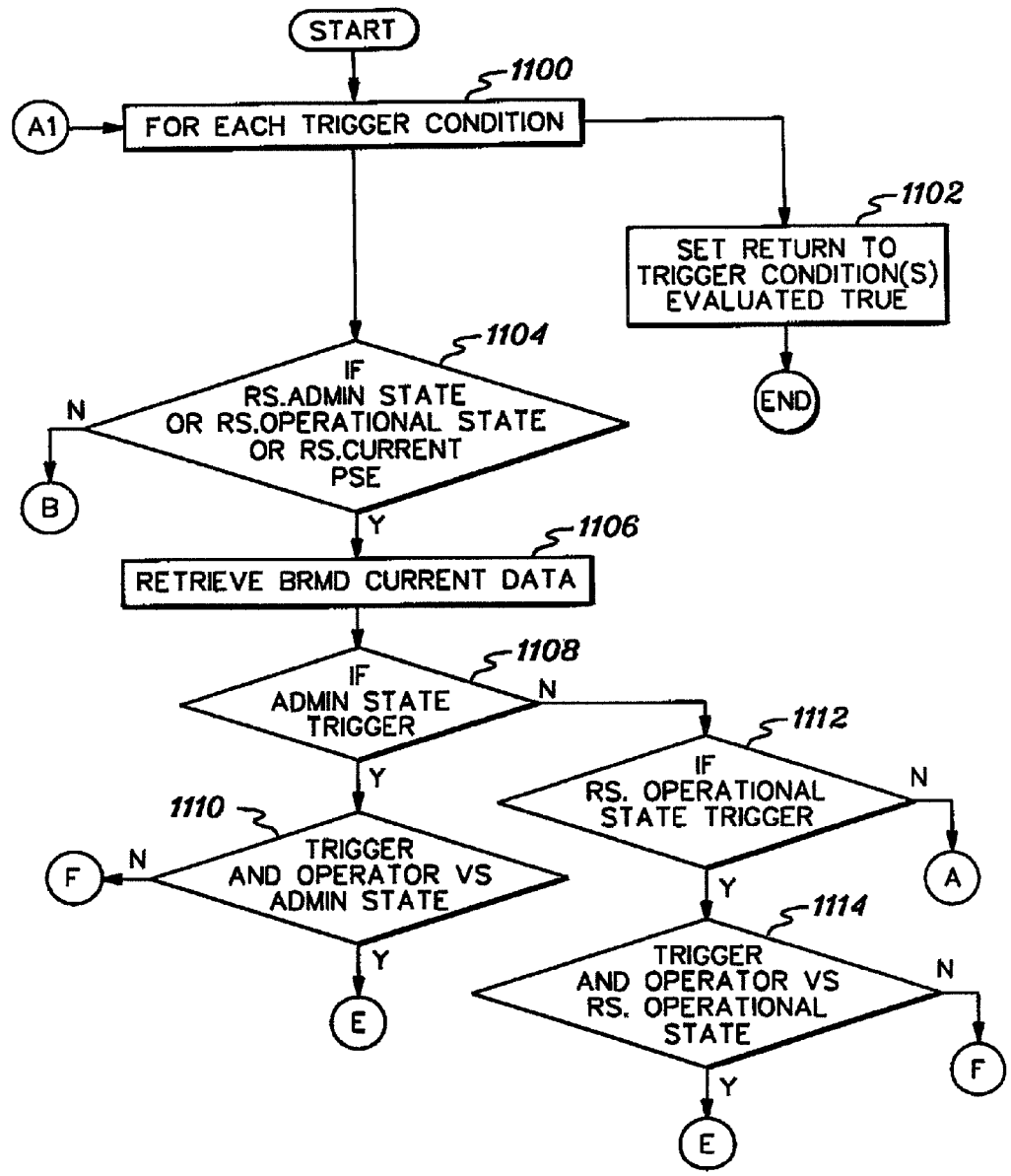
FIGS. 11A-11E depict one embodiment of the logic to dynamically evaluate triggers in pairing use, in accordance with an aspect of the present invention.

Referring to FIG. 11A, for each trigger condition specified on the pairing, STEP 1100, an evaluation is made of the conditions specified and the current runtime, as described below. When the conditions have been evaluated as true, processing returns indicating the trigger overall evaluated as true, STEP 1102.

Figure 11B:
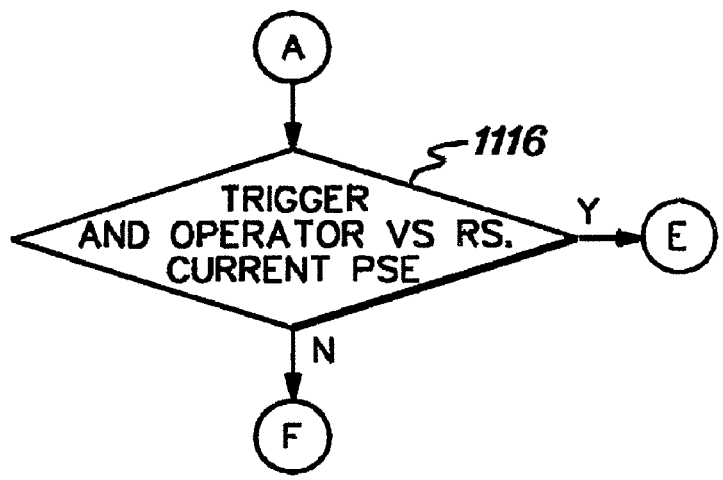

During evaluation, if the trigger specified RS.Admin state or RS.Operational state or RS.Current PSE, INQUIRY 1104, the current data for the BRMD of the RS is retrieved, STEP 1106. If RS.Admin state was specified, INQUIRY 1108, the specified state value is compared "equal" or "not equal" as defined by the trigger operator against the current RS.Admin state, INQUIRY 1110. If true, processing continues at the next trigger condition, STEP 1144 (FIG. 11E), as described below. Otherwise, processing returns indicating the trigger overall evaluated as false, STEP 1146 (FIG. 11E).

Returning to INQUIRY 1108 (FIG. 11A), if RS.Admin state was not specified, a determination is made as to whether the trigger specified RS.Operational state, INQUIRY 1112. If so, the specified state value is compared "equal" or "not equal" as defined by the trigger operator against the current RS.Operational, aggregated state, INQUIRY 1114. If true, processing continues at the next trigger condition, STEP 1144 (FIG. 11E). Otherwise, processing returns indicating the trigger overall evaluated as false, STEP 1146.

Returning to INQUIRY 1112 (FIG. 11A), if the trigger did not specify RS.Operational state, then the trigger specified RS.CurrentPSE. Thus, the specified PSE is compared "equal" or "not equal" as defined by the trigger operator against the current RS.CurrentPSE, INQUIRY 1116 (FIG. 11B). If true, processing continues at the next trigger condition, STEP 1144 (FIG. 11E). Otherwise, processing returns indicating the trigger overall evaluated as false, STEP 1146.

Figure 11C:
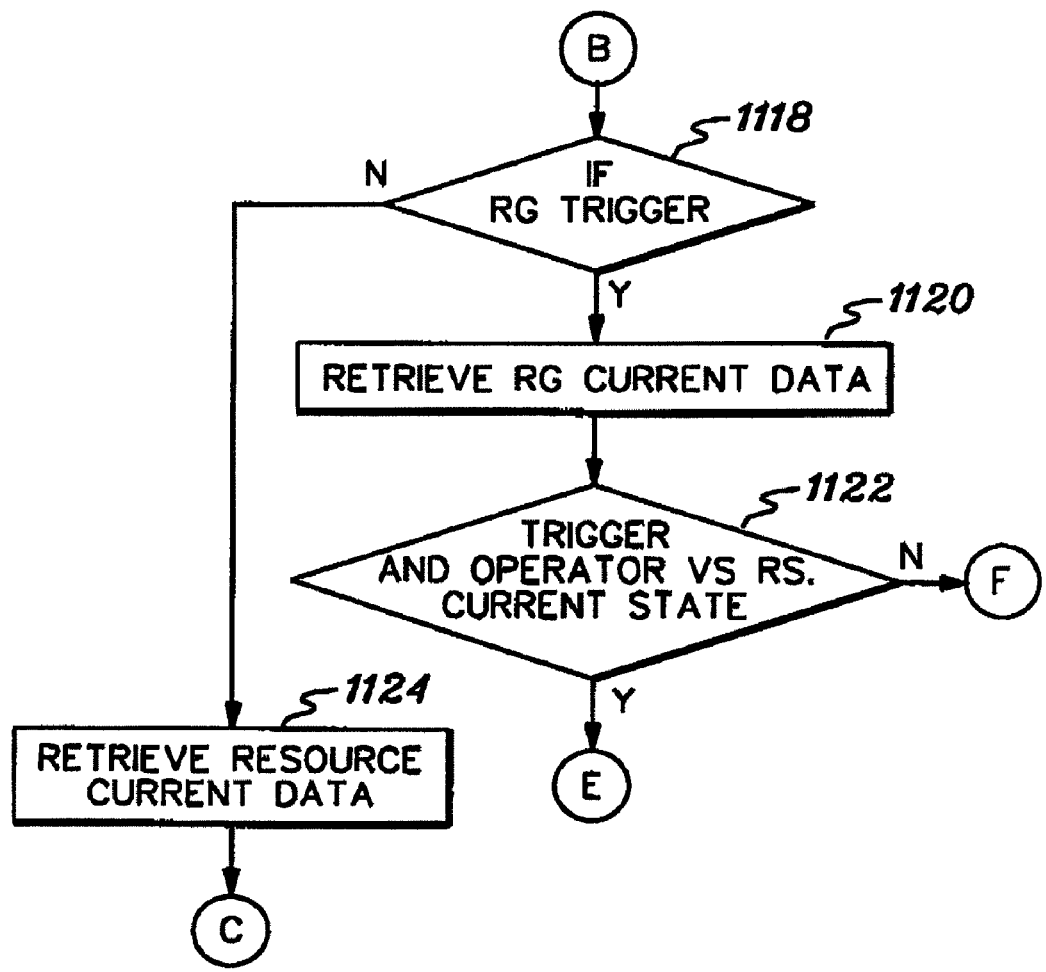
Figure 11D:
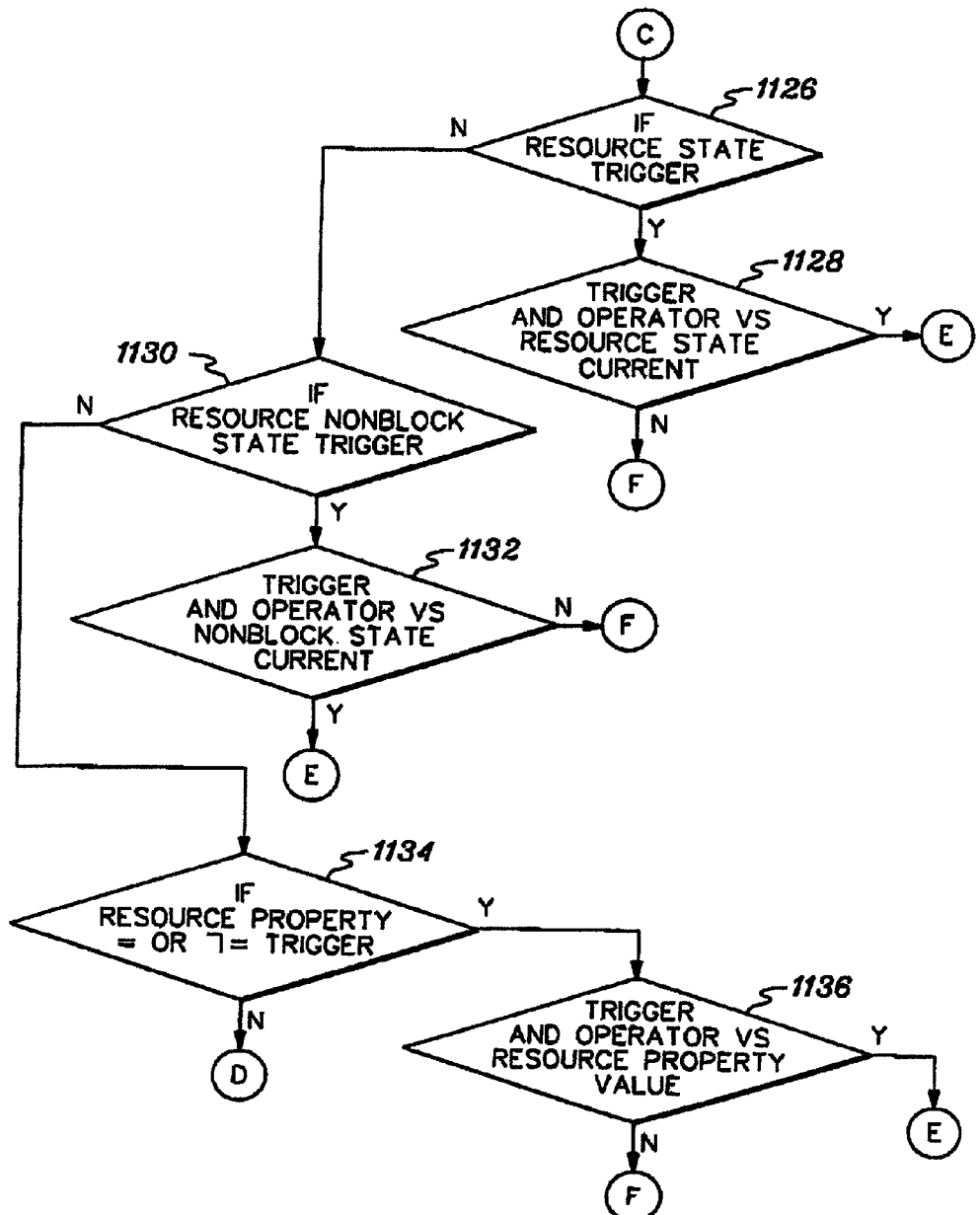
Figure 11E:
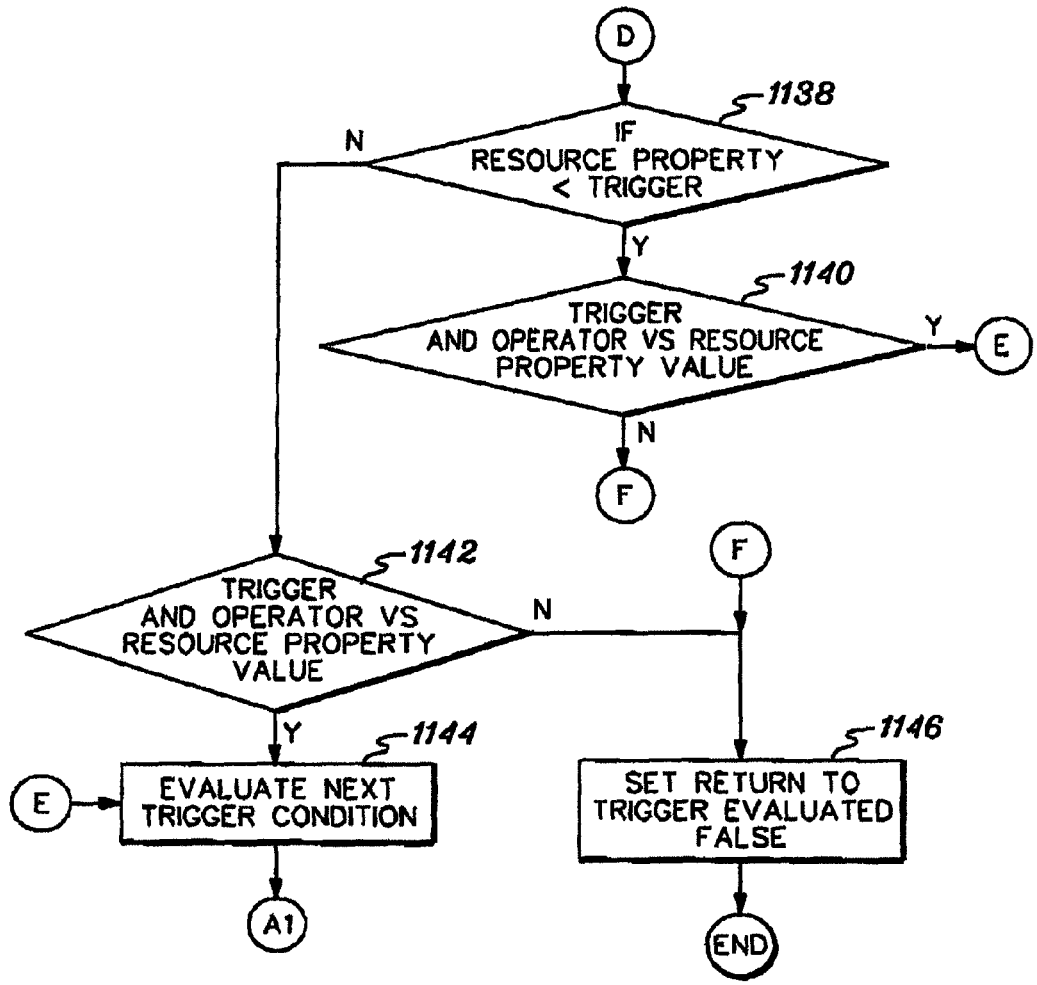

Returning to INQUIRY 1104 (FIG. 11A), if the trigger did not specify RS.admin state or RS.operational state or RS.current PSE, a determination is made as to whether the trigger specified RG, INQUIRY 1118 (FIG. 11C). If the trigger specified RG, the current RG data is retrieved, STEP 1120. BR configuration recommendations suggest backing the RG table with database buffer pool storage sufficient in size to insure retrieval requests are satisfied from memory access. The trigger specified RG state is compared "equal" or "not equal" as defined by the trigger operator against the current RG state, INQUIRY 1122. If true, processing continues at the next trigger condition, STEP 1144 (FIG. 11E). Otherwise, processing returns indicating the trigger overall evaluated as false, STEP 1146.

Returning to INQUIRY 1118 (FIG. 11C), for trigger conditions which specify a Resource, the current resource data is retrieved, STEP 1124. If the trigger specified resource state, INQUIRY 1126 (FIG. 11D), the trigger specified resource state is compared "equal" or "not equal" as defined by the trigger operator against the current resource state, INQUIRY 1128. If true, processing continues at the next trigger condition, STEP 1144 (FIG. 11E). Otherwise, processing returns indicating the trigger overall evaluated as false, STEP 1146.

Returning to INQUIRY 1126 (FIG. 11D), if the trigger did not specify resource state, a determination is made as to whether the trigger specified resource nonblocking state, INQUIRY 1130. If so, the trigger specified resource nonblocking state is compared "equal" or "not equal" as defined by the trigger operator against the current resource nonblocking state, INQUIRY 1132. If true, processing continues at the next trigger condition, STEP 1144 (FIG. 11E). Otherwise, processing returns indicating the trigger overall evaluated as false, STEP 1146.

Returning to INQUIRY 1130 (FIG. 11D), if the trigger did not specify resource nonblocking state, then if the trigger specified resource property equality to value comparison, INQUIRY 1134, the trigger specified property value is compared "equal" or "not equal" as defined by the trigger operator against the current resource property value, INQUIRY 1136. If true, processing continues at the next trigger condition, STEP 1144 (FIG. 11E). Otherwise, processing returns indicating the trigger overall evaluated as false, STEP 1146.

Returning to INQUIRY 1134, if the trigger did not specify resource property equality to value comparison, a determination is made as to whether the trigger specified a resource property less than comparison, INQUIRY 1138 (FIG. 11E). For a trigger condition which specified a less than comparison, the trigger specified property value is compared "less than" against the current resource property value, INQUIRY 1140. If true, processing continues at the next trigger condition, STEP 1144. Otherwise, processing returns indicating the trigger overall evaluated as false, STEP 1146.

Returning to INQUIRY 1138, for a trigger condition which specified greater than comparison, the trigger specified property value is compared "greater than" against the current resource property value, INQUIRY 1142. If true, processing continues at the next trigger condition, STEP 1144, in which processing proceeds to STEP 1100 (FIG. 11A). Otherwise, processing returns indicating the trigger overall evaluated as false, STEP 1146. This concludes processing.

Described in detail above is one technique appropriate for any of the pairing types. A more optimized implementation may be achieved by construction of a routine specific to the trigger set-of-conditions for each defined pairing. During trigger set-of-condition specification, the conditions for the trigger can cause creation of comparison statements returning evaluation of true or false. The comparison statements can be compiled into a runtime routine or can be translated to executable binaries depending on language and performance optimization preferences. The resulting executable binary would be invoked when evaluation of execution for the pairing is required resulting in more efficient and tailored trigger processing.

Extensions to the above technique may be made to provide for additional logical operators between trigger conditions. The above technique asserts all trigger conditions are to evaluate true for the pairing to be evaluated as true—logically an AND of the conditions. Alterations to the construction of trigger conditions and evaluation of trigger conditions can be introduced in support of one or more of the conditions being evaluated as true resulting in the pairing overall being evaluated as true—logically an OR of the conditions.

Deletion of Pairing

The deletion of a pairing deletes the BRRD entry associated with the pairing. The flow first logs the information to be deleted, so that any relevant data on ordering, impact, operation effect, constraints, prep effect, co-location or constraint is captured in case the BR Administrator wants to reuse any of the specifications. This flow is initiated from the UI, as one example, and one embodiment of the logic is as follows:

Via UI, customer selects the pairing to be deleted, check on whether sure?
a Input=Entry to be deleted=del_entry
START TRAN DEL_BRRD_PAIRING
Insert into the RS Activity log: information that is in the BRMD and BRRD for the pairing being deleted:
  a. What BRRD pairing rules content it has,
  b. Resource identifiers for the BRRD entry
  c. What BRMD/RG/RS metadata was associated with each resource of the BRRD pair Read with CS isolation BRRD
DELETE the BRRD entry
INSERT BRM_Activity_LOG: BRRD entry deleted, brrd_entry_deleted, content of del_entry, timestamp
CMIT Predictive Analysis Using Pairings Pairing(s) can be used to support predictive analysis of actions that would be taken by the BR system. Executing in a tooling environment the predictive routines support the BR Administrator by operating on hypothetical configurations and detected events. Examples include:

For a defined RS and pairing set, if a resource becomes degraded, unavailable or fails, what other resources will become degraded, unavailable or fail. This information may assist the BR administrator understand the relationship of resource outages and resulting recovery requirements.

For a defined RS, RTO objective and state for resources within the RS, what would be the generated preparatory workflow. The workflow represents steps employed to alter the IT environment in a way which will enable achievement of the recovery time. The activities could be performed through submitting the workflow. Alternatively, manual execution of the activities can be performed resulting in resource state changes. Reevaluation of the preparatory workflow will reflect the altered state of resources with removed activities.

For a set of co-location pairings and RG specifications, a recovery requiring start or restart of resources can predict the target computer systems and operating systems resources.

For a set of operation effect and constraint pairings, a defined RS and hypothetical failure can predict if a recovery plan would be allowed or disallowed.

Other predictive scenarios can be created. Tooling to utilize pairings, hypothetical IT environments and hypothetical events provide the BR Administrator the ability to understand system behavior without suffering IT resource outages. Alterations in pairings, along with iterative predictive analysis, enables refinement of recovery plans and validation of intended results from pairings specification.

Described in detail herein is a capability for conditionally controlling management of an IT environment based on real-time analysis of pairing constructs. By employing runtime evaluation of pairing constructs in performing management tasks, the results of those tasks are effected by the current environment. This optimizes the management of the environment.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 12:
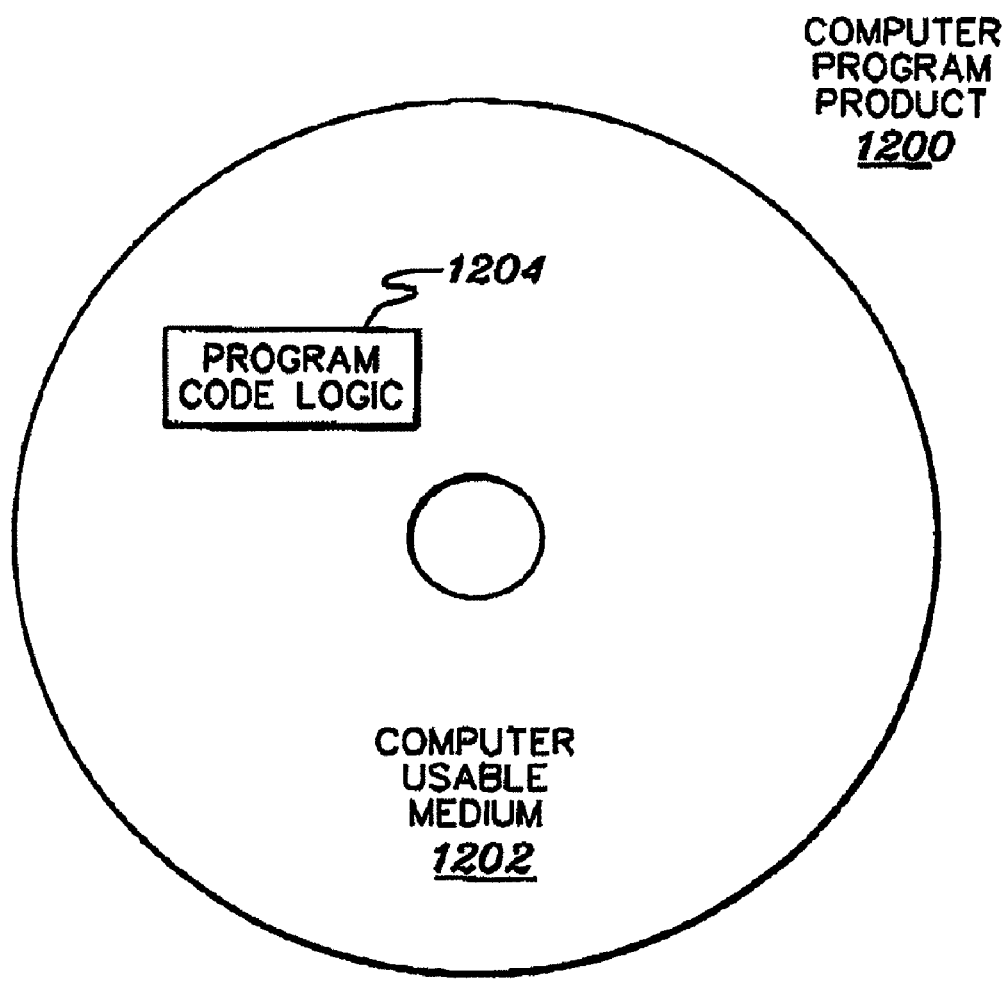
FIG. 12 depicts one embodiment of a computer program product incorporating one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for conditionally controlling management of an IT environment based on current conditions of the environment. This enables a flexible, optimal management technique to be provided. Further, a capability is provided that enables pairing constructs to be used in predicting results in management tasks. Advantageously, the pairing constructs can be customized by the customer. Also, they can be revised, added to and/or deleted during runtime, thereby dynamically altering the runtime behavior of the environment.

Although various embodiments are described above, these are only examples. For example, the processing environments described herein are only examples of environments that may incorporate and use one or more of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating management of an Information Technology (IT) environment, said method comprising:
    evaluating at runtime, by a processor, a pairing construct usable in managing the IT environment, the pairing construct being explicitly defined and including a first specified resource, a second specified resource and an explicit directive to act on the specified second resource, the evaluating at runtime comprising using one or more runtime characteristics of the IT environment to assess based on the then current runtime environment an effect of the pairing construct on a current runtime state of the IT environment to determine whether the pairing construct is to be used in runtime management of the IT environment; and
    conditionally controlling management of the IT environment based on the runtime evaluation of the pairing construct, wherein the conditionally controlling comprises using the pairing construct to manage the IT environment, based on the evaluating at runtime determining that the pairing construct is to be used.

2. The computer-implemented method of claim 1, wherein a result of a task to be performed in managing the IT environment is effected by the current runtime evaluation of the pairing construct.

3. The computer-implemented method of claim 1, wherein the pairing construct further comprises a set of conditions to control enforcement of the pairing construct based on runtime characteristics of the IT environment.

4. The computer-implemented method of claim 1, wherein the first resource comprises one of the following resource types: a resource; a resource and resource operation; a resource and property, value; or a resource and state, value; and wherein the second resource comprises one of the following resource types: a resource; a resource and operation; a resource and state; or a resource and state, value.

5. The computer-implemented method of claim 1, wherein the directive includes ordering of operations across the first resource and the second resource indicating one operation of a resource of the first resource or the second resource is to be performed after or before another operation of another resource of the first resource or the second resource.

6. The computer-implemented method of claim 1, wherein the evaluating comprises evaluating a plurality of pairing constructs to determine whether one or more pairing constructs of the plurality of pairing constructs is to be used in runtime management of the IT environment.

7. The computer-implemented method of claim 1, further comprising revising the pairing construct in real-time, wherein runtime behavior of the IT environment is dynamically altered based on the revision.

8. The computer-implemented method of claim 1, further comprising adding a pairing construct in real-time, wherein the runtime behavior of the IT environment is dynamically altered based on the addition.

9. The computer-implemented method of claim 1, wherein the pairing construct is customizable.

10. The computer-implemented method of claim 1, further comprising using at least one pairing construct of one or more pairing constructs to provide predictive analysis for the IT environment.

11. The computer-implemented method of claim 10, wherein the predictive analysis includes at least one of:
    an assessment of impact of failures;
    an assessment of business application constraints;
    an assessment of operation ordering;
    an assessment of co-location;
    an assessment of operation effect; or
    an assessment of preparatory effect.

12. A computer system for facilitating management of an Information Technology (IT) environment, said computer system comprising:
    a memory; and
    a processor in communications with the memory, wherein the computer system is configured to perform a method, the method comprising:
        evaluating at runtime, by a processor, a pairing construct usable in managing the IT environment, the pairing construct being explicitly defined and including a first specified resource, a second specified resource and an explicit directive to act on the specified second resource, the evaluating at runtime comprising using one or more runtime characteristics of the IT environment to assess based on the then current runtime environment an effect of the pairing construct on a current state of the IT environment to determine whether the pairing construct is to be used in runtime management of the IT environment; and
        conditionally controlling management of the IT environment based on the runtime evaluation of the pairing construct, wherein the conditionally controlling comprises using the pairing construct to manage the IT environment, based on the evaluating at runtime determining that the pairing construct is to be used.

13. The computer system of claim 12, wherein the evaluating comprises evaluating a plurality of pairing constructs to determine whether one or more pairing constructs of the plurality of pairing constructs is to be used in runtime management of the IT environment.

14. The computer system of claim 12, wherein the method further comprises using at least one pairing construct of one or more pairing constructs to provide predictive analysis for the IT environment.

15. A computer program product for facilitating management of an Information Technology (IT) environment, the computer program product comprising:
    a non-transitory storage medium readable by a processor and storing instructions for execution by the processor for performing a method comprising:
        evaluating at runtime a pairing construct usable in managing the IT environment, the pairing construct being explicitly defined and including a first specified resource a second specified resource and an explicit directive to act on the specified second resource, the evaluating at runtime comprising using one or more runtime characteristics of the IT environment to assess based on the then current runtime environment an effect of the pairing construct on a current state of the IT environment to determine whether the pairing construct is to be used in runtime management of the IT environment; and conditionally controlling management of the IT environment based on the runtime evaluation of the pairing construct, wherein the conditionally controlling comprises using the pairing construct to manage the IT environment, based on the evaluating at runtime determining that the pairing construct is to be used.

16. The computer program product of claim 15, wherein the evaluating comprises evaluating a plurality of pairing constructs to determine whether one or more pairing constructs of the plurality of pairing constructs is to be used in runtime management of the IT environment.

17. The computer program product of claim 15, wherein the method further comprises revising the pairing construct in real-time, wherein runtime behavior of the IT environment is dynamically altered based on the revision.

18. The computer program product of claim 15, wherein the method further comprises using at least one pairing construct of one or more pairing constructs to provide predictive analysis for the IT environment.

19. The computer-implemented method of claim 1, wherein the directive includes impact of resource property specifying an impact of one resource of the first resource or the second resource on another resource of the first resource or the second resource in terms of degradation or impact.

20. The computer-implemented method of claim 1, wherein the directive includes operation effect specifying an effect executing an operation on a resource of the first resource or the second resource can have on a state of the resource.

21. The computer-implemented method of claim 1, wherein the directive includes preparatory effect specifying an effect a preparatory operation can have on a recovery operation.

22. The computer-implemented method of claim 1, wherein the directive includes co-location of resources indicating whether the first resource is to be hosted on a same container as the second resource.

23. The computer-implemented method of claim 1, wherein the directive includes one or more constraints on recovery actions that may be taken.

* * * * *